US012715430B2

(12) United States Patent
Kato et al.

(10) Patent No.: US 12,715,430 B2
(45) Date of Patent: Aug. 25, 2026

(54) CONTROL SYSTEM, IN-VEHICLE DEVICE, AND COORDINATION DEVICE

(71) Applicant: HITACHI ASTEMO, LTD., Hitachinaka (JP)

(72) Inventors: Yuma Kato, Tokyo (JP); Tasuku Ishigooka, Tokyo (JP); Yoshitaka Atarashi, Tokyo (JP); Hideki Endo, Tokyo (JP)

(73) Assignee: Hitachi Astemo, Ltd., Ibaraki (JP)

( * ) Notice: Subject to any disclaimer, the term of this patent is extended or adjusted under 35 U.S.C. 154(b) by 217 days.

(21) Appl. No.: 18/266,616

(22) PCT Filed: Aug. 26, 2021

(86) PCT No.: PCT/JP2021/031311

§ 371 (c)(1), (2) Date: Jun. 12, 2023

(87) PCT Pub. No.: WO2022/149302

PCT Pub. Date: Jul. 14, 2022

(65) Prior Publication Data

US 2024/0092352 A1 Mar. 21, 2024

(30) Foreign Application Priority Data

Jan. 5, 2021 (JP) ................................ 2021-000559

(51) Int. Cl.

*B60W 30/09* (2012.01)
*B60W 60/00* (2020.01)
*G08G 1/16* (2006.01)

(52) U.S. Cl.

CPC ........ *B60W 30/09* (2013.01); *B60W 60/0015* (2020.02); *G08G 1/16* (2013.01)

(58) Field of Classification Search

CPC .. B60W 30/09; B60W 30/10; B60W 60/0015; G08G 1/16; G08G 1/166

See application file for complete search history.

(56) References Cited

U.S. PATENT DOCUMENTS 10,802,106 B2 * 10/2020 Sogabe .................... G01S 5/14
2019/0079161 A1 * 3/2019 Sogabe .................... G01S 5/14

(Continued)

FOREIGN PATENT DOCUMENTS

CN 102546726 A 7/2012
CN 109693668 A 4/2019

(Continued)

OTHER PUBLICATIONS

International Search Report dated Nov. 16, 2021 for PCT International Application No. PCT/JP2021/031311.

(Continued)

*Primary Examiner* — Tarek Elarabi
(74) *Attorney, Agent, or Firm* — Volpe Koenig

(57) ABSTRACT

To achieve both guarantee of safety related to vehicle control and improvement of availability in an in-vehicle device that cannot independently perform automatic driving and needs assistance of vehicle control. To achieve the above object, a control system includes an in-vehicle device and a coordination device that are synchronized in time point. The control system includes a travelable time calculation unit that calculates a travelable time for guaranteeing that a vehicle does not collide with an obstacle on a travel trajectory in a target region through which the vehicle equipped with the in-vehicle device passes, a travelability determination unit that determines validity of the travelable time, and a trajectory following unit that permits the in-vehicle device to follow the travel trajectory when it is determined that the travelable time is valid.

5 Claims, 20 Drawing Sheets

(56) References Cited

U.S. PATENT DOCUMENTS

| | | | |
|---|---|---|---|
| 2020/0090511 | A1 | 3/2020 | Tao et al. |
| 2020/0180519 | A1 | 6/2020 | Mori |
| 2021/0114591 | A1 | 4/2021 | Kamiya et al. |

FOREIGN PATENT DOCUMENTS

| | | | |
|---|---|---|---|
| JP | 2017-173905 | A | 9/2017 |
| JP | 2020-006763 | A | 1/2020 |
| JP | 2020-042643 | A | 3/2020 |
| JP | 2020-045090 | A | 3/2020 |
| JP | 2020-091663 | A | 6/2020 |

OTHER PUBLICATIONS

Chinese Office Action issued on Aug. 9, 2025 for Chinese Patent Application No. 202180084003.6.

* cited by examiner

224

<TRAJECTORY INFORMATION>

| ID | WP0 |
| --- | --- |
| COORDINATES | (35.670,139.800) |

| ID | WP1 |
| --- | --- |
| COORDINATES | (33.641,139.790) |

| ID | WP2 |
| --- | --- |
| COORDINATES | (30.660,140.193) |

| ID | WP3 |
| --- | --- |
| COORDINATES | (28.220,147.976) |

| ID | WP4 |
| --- | --- |
| COORDINATES | (27.430,152.190) |

START
S1331
j←0
S1332
j<(NUMBER OF Way Points−1)?
YES
NO
S1333
$T_{follow[j]} = \frac{\sqrt{2*a*D[j]+V0[j-1]^2} - V0[j-1]}{a} + T_{follow[j-1]}$
$V0[j-1]$ : CURRENT VEHICLE SPEED
$a$ : ACCELERATION
$T_{follow[j-1]}$ : CURRENT TIME POINT
S1334
j←j+1
S1335
$V0[j]=V0[j-1]+a*(T_{follow[j]}-T_{follow[j-1]})$
END

| | ST | FT |
|---|---|---|
| WP_A0 | T0 | T2 |
| **WP_A1** | **T1** | **T3** |
| WP_A2 | T2 | T4 |
| WP_A3 | T3 | T5 |
| WP_A4 | T4 | T6 |

| | ST |
|---|---|
| WP_B0 | T0 |
| WP_B1 | T1 |
| WP_B2 | T2 |
| **WP_B3** | **T3** |
| WP_B4 | T4 |
| WP_B5 | T5 |

CONTROL SYSTEM, IN-VEHICLE DEVICE, AND COORDINATION DEVICE

TECHNICAL FIELD

The present invention relates to a control system, an in-vehicle device, and a coordination device.

BACKGROUND ART

As the known technique for realizing automatic driving of a vehicle, there is a technique disclosed in JP 2020-45090 A (PTL 1). JP 2020-45090 A aims to "provide an aspect of automatic driving of vehicle control assistance", and discloses, as a solution, "a vehicle automatic driving control assistance method including a step of acquiring sensing information regarding an environment, which has been collected by at least one sensor separately from a vehicle in the environment, a step of determining an environment sensing result related to the environment, which indicates related information of a plurality of objects including the vehicle in the environment by processing the acquired sensing information, and a step of assisting in controlling a driving action of the vehicle by providing the environment sensing result for a vehicle-side control device related to the vehicle".

Further, JP 2020-42643 A (PTL 2) aims to "cause a vehicle subjected to automatic driving to travel safely even when a communication process between a plurality of communication devices is not stable", and discloses, as a solution, that "a vehicle control device includes an acquisition unit that acquires a communication cycle of a communication process between a plurality of communication devices, and a control unit that decreases a speed of a vehicle at a predetermined timing when braking of the vehicle is started or increases a deceleration at a predetermined timing so that the vehicle does not collide with an object, when a delay time of the acquired communication cycle based on a predetermined communication cycle is equal to or longer than a threshold value set in advance or when retransmission control is performed in the communication process between the plurality of communication devices".

CITATION LIST

Patent Literature

PTL 1: JP 2020-45090 A
PTL 2: JP 2020-42643 A

SUMMARY OF INVENTION

Technical Problem

In PTL 1, for a vehicle that cannot independently perform automatic driving and needs assistance of vehicle control, a coordination device assists the vehicle control by transmitting information regarding a travel trajectory to the vehicle, and thus the vehicle can automatically perform the vehicle control by following trajectory information.

However, the delay occurring in communication between the coordination device and an in-vehicle device is not taken into consideration, and thus there is a problem that there is a difference between a time point at which the calculation is performed by the coordination device and a time point at which the control is performed by the in-vehicle device, it is not guarantee the safety of the vehicle control.

On the other hand, in PTL 2, the threshold value of the communication delay is provided based on the communication cycle between the coordination device and the in-vehicle device, and when the communication delay exceeds the threshold value, the vehicle is decelerated or stopped, whereby it is possible to guarantee the safety of vehicle control.

However, the time (that is, the allowable communication delay amount) when the information transmitted to the in-vehicle device by the coordination device is valid does not necessarily coincide with the communication cycle. For example, in the case of turning right at an intersection, an allowable communication delay is short when an oncoming vehicle is approaching, and the allowable communication delay is long when the oncoming vehicle is not approaching. Therefore, when the threshold value of the communication delay is set to a fixed value determined in advance, there is a problem that the threshold value is set pessimistically for safety, and the vehicle is frequently decelerated or stopped.

Therefore, in an in-vehicle device that cannot independently perform automatic driving and needs assistance of vehicle control, an object is to achieve both guarantee of safety related to vehicle control and improvement of availability.

The present invention has been made in view of the above problems, and an object thereof is to provide a control system, an in-vehicle device, and a coordination device capable of guaranteeing safety of vehicle control and suppressing the number of times of decelerating or stopping a vehicle.

Solution to Problem

To achieve the above objects, a control system includes an in-vehicle device and a coordination device that are synchronized in time point. The control system includes a travelable time calculation unit that calculates a travelable time for guaranteeing that a vehicle does not collide with an obstacle on a travel trajectory in a target region through which the vehicle equipped with the in-vehicle device passes, a travelability determination unit that determines validity of the travelable time, and a trajectory following unit that permits the in-vehicle device to follow the travel trajectory when it is determined that the travelable time is valid.

In addition, to achieve the above objects, there is provided an in-vehicle device that is synchronized in time point with a coordination device installed outside a vehicle. The in-vehicle device includes a reception unit that receives, from the coordination device, a travelable time for guaranteeing that a vehicle does not collide with an obstacle on a travel trajectory in a target region through which the vehicle equipped with the in-vehicle device passes, a travelability determination unit that determines validity of the received travelable time, and a trajectory following unit that permits the in-vehicle device to follow the travel trajectory when it is determined that the travelable time is valid.

Furthermore, to achieve the above objects, there is provided a coordination device that is synchronized in time point with an in-vehicle device. The coordination device includes a travelable time calculation unit that calculates a travelable time for guaranteeing that the vehicle does not collide with an obstacle on a travel trajectory in a target region through which the vehicle equipped with the in-vehicle device passes, and a transmission unit that transmits the travelable time to the in-vehicle device in order to determine validity of the travelable time.

Advantageous Effects of Invention

According to the present invention, since vehicle control is performed in consideration of a delay actually occurring in communication between an in-vehicle device and a coordination device, it is possible to guarantee the safety of the vehicle control. In addition, since the travelable time is calculated based on the situation of an obstacle or the like when a travel trajectory is generated, the allowable communication delay time becomes long when there is no obstacle or the like on the travel trajectory and when there is no approaching obstacle or the like, and it is possible to suppress the number of times of decelerating or stopping the vehicle.

Objects, configurations, and advantageous effects other than those described above will be clarified by the descriptions of the following embodiments.

DESCRIPTION OF EMBODIMENTS

The present examples relate to a control system, and in particular, to a control system for realizing automatic driving in which a vehicle autonomously travels to follow a travel trajectory (perform trajectory following).

Hereinafter, examples (examples) of preferred embodiments of the present invention will be described with reference to the drawings.

Example 1

<Configuration of Control System>

Figure 1:
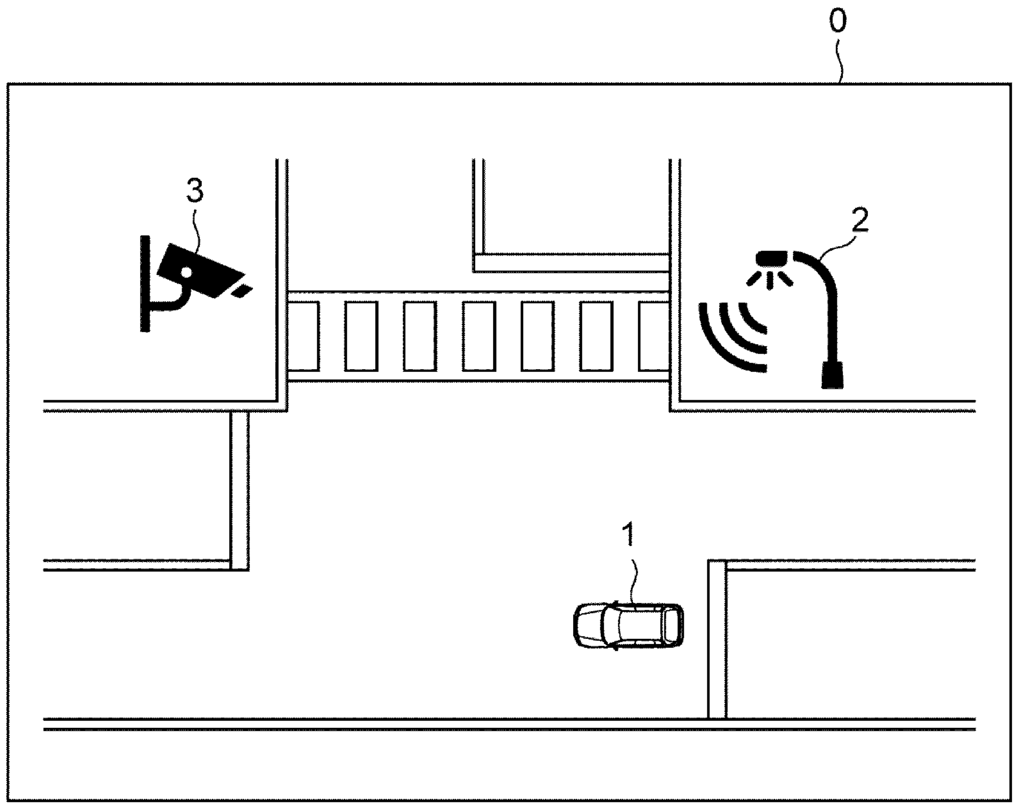
FIG. 1 is a diagram illustrating a configuration of a control system 0 according to Example 1.

FIG. 1 is a diagram illustrating a configuration of a control system 0 according to Example 1.

The control system 0 includes an in-vehicle device 1, a coordination device 2, and an infrastructure sensor 3.

The in-vehicle device 1 cannot independently perform automatic driving and needs assistance of vehicle control, and performs automatic driving by receiving information for assisting vehicle control from the coordination device 2. For example, the in-vehicle device 1 can (independently) perform automatic driving by using map information, information acquired by a sensor mounted on a vehicle (own vehicle), and the like under a predetermined situation. However, the in-vehicle device 1 cannot perform automatic driving alone under a specific situation such as an intersection, and performs automatic driving by receiving (acquiring) information for assisting vehicle control from the coordination device 2.

The coordination device 2 has a role of generating information for assisting vehicle control based on information from the infrastructure sensor 3 and transmitting the generated information to the in-vehicle device 1 by wireless communication. The coordination device 2 is a control device other than the infrastructure sensor 3 and the in-vehicle device 1, and is specifically a server, a cloud, a road side unit (RSU), or the like.

The infrastructure sensor 3 is a sensor, for example, a camera, a LIDAR sensor, a radar, or other sensing devices, that is capable of measuring information of a speed, a distance, and the like of an obstacle in a target region through which the vehicle equipped with the in-vehicle device 1 passes.

<Functional Block Configuration and Outline of Overall Operation Flow of Control System>

Figure 2:
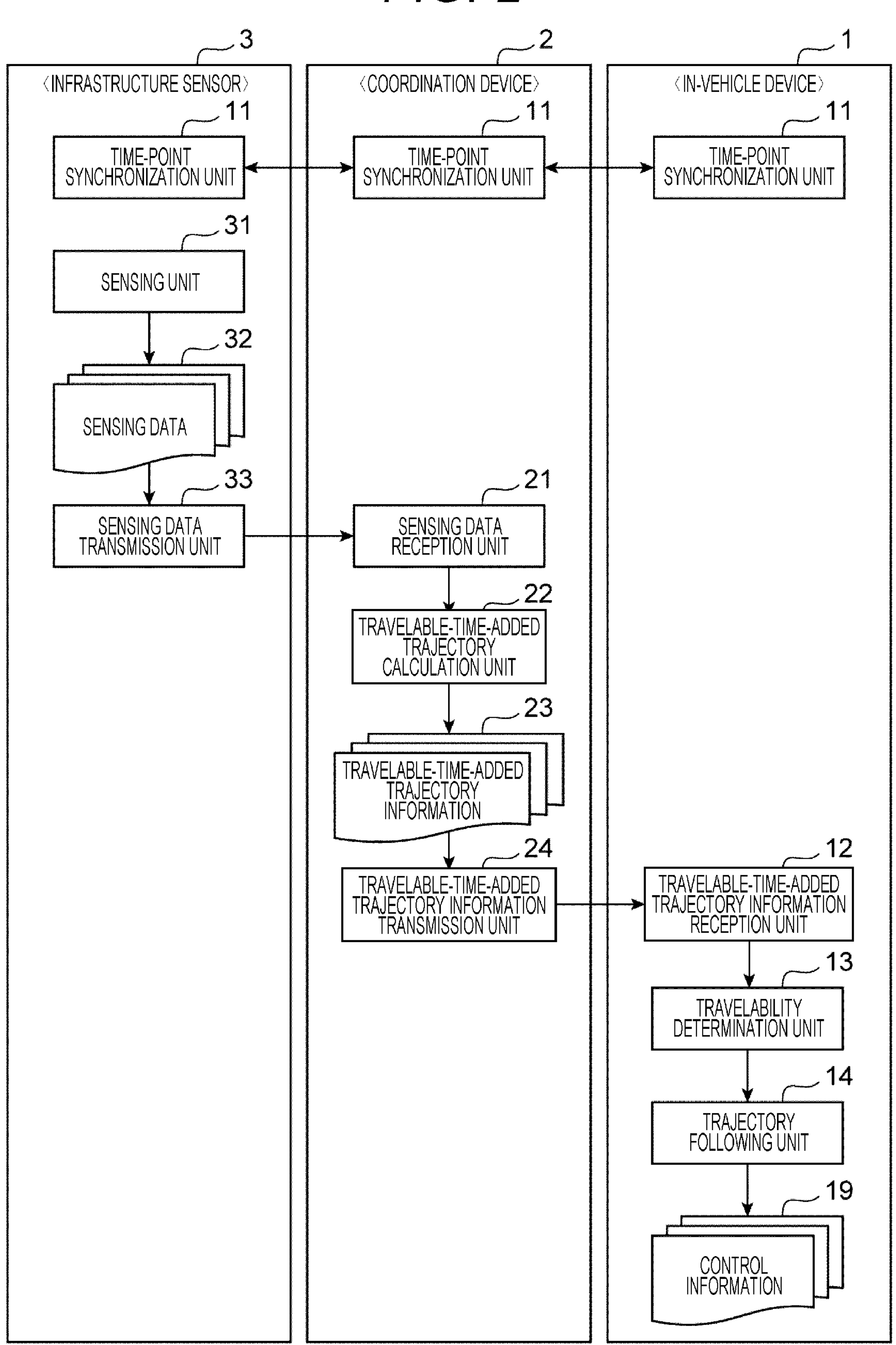
FIG. 2 is a diagram illustrating a functional block configuration and an outline of an overall operation flow of the control system 0 in Example 1.

FIG. 2 is a diagram illustrating a functional block configuration and an outline of an overall operation flow of the control system 0 in Example 1.

First, the in-vehicle device 1, the coordination device 2, and the infrastructure sensor 3 each include a time-point synchronization unit 11, and perform synchronization in time point with each other.

Next, the infrastructure sensor 3 includes a sensing unit 31 and a sensing data transmission unit 33. The sensing unit 31 generates sensing data 32. For example, when the infrastructure sensor 3 is a camera, the sensing unit 31 is a complementary MOS (CMOS) imaging sensor, and the sensing data 32 is pixel information data. The sensing data transmission unit 33 outputs the sensing data 32 to the coordination device 2.

Then, the coordination device 2 includes a sensing data reception unit 21, a travelable-time-added trajectory calculation unit 22, and a travelable-time-added trajectory information transmission unit 24. The sensing data reception unit 21 receives the sensing data 32 from the infrastructure sensor 3 and inputs the sensing data 32 to the travelable-time-added trajectory calculation unit 22. The travelable-time-added trajectory calculation unit 22 outputs travelable-time-added trajectory information 23 based on the sensing data 32. The travelable-time-added trajectory information transmission unit 24 outputs the travelable-time-added trajectory information 23 to the in-vehicle device 1.

The in-vehicle device 1 (specifically, a control unit that performs vehicle control) includes a travelable-time-added trajectory information reception unit 12, a travelability determination unit 13, and a trajectory following unit 14. The travelable-time-added trajectory information reception unit 12 receives the travelable-time-added trajectory information 23 from the coordination device 2 and inputs the travelable-time-added trajectory information 23 to the travelability determination unit 13. The travelability determination unit 13 determines whether or not the vehicle equipped with the in-vehicle device 1 can travel in accordance with the travelable-time-added trajectory information 23 (that is, whether or not the travelable-time-added trajectory information 23 is valid). The travelability determination unit 13 outputs the travelable-time-added trajectory information 23 to the trajectory following unit 14 only when it is determined that the vehicle can travel. Upon receiving the travelable-time-added trajectory information 23, the trajectory following unit 14 outputs control information 19 for moving the vehicle equipped with the in-vehicle device 1, in accordance with the received travelable-time-added trajectory information 23.

According to the above operation flow, for the in-vehicle device 1 that cannot independently perform automatic driving and needs assistance of vehicle control, the coordination device 2 generates trajectory information for assisting vehicle control based on the information from the infrastructure sensor 3 and transmits the trajectory information to the in-vehicle device 1, and the in-vehicle device 1 receives the trajectory information and performs following control, thereby realizing automatic driving of the vehicle equipped with the in-vehicle device 1.

<Time-Point Synchronization Unit>

Figure 3A:
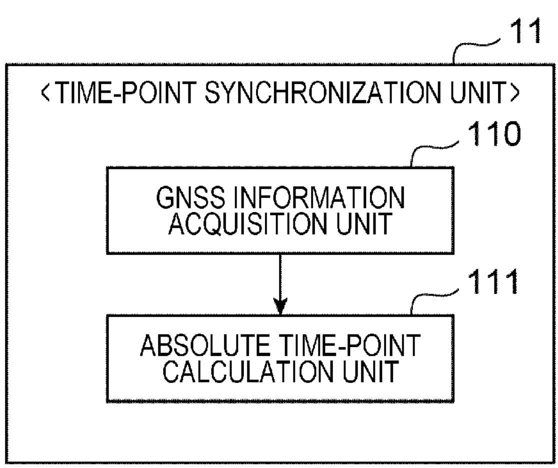
FIG. 3A is a diagram illustrating an example of a method of time-point synchronization performed in a time-point synchronization unit 11 in each of an in-vehicle device 1, a coordination device 2, and an infrastructure sensor 3.

FIG. 3A is a diagram illustrating an example of a method of time-point synchronization performed in the time-point synchronization unit 11 in each of the in-vehicle device 1, the coordination device 2, and the infrastructure sensor 3. In this example, the time-point synchronization unit 11 includes a GNSS information acquisition unit 110 and an absolute time-point calculation unit 111.

The GNSS information acquisition unit 110 in the time-point synchronization unit 11 receives data including a transmission time point expressed by an absolute time point from a global navigation satellite system (GNSS). At this time, the absolute time-point calculation unit 111 can calculate an error of a clock mounted on the own device by receiving data from four or more artificial satellites. Therefore, the current absolute time can be calculated from the time point at which the satellite transmits the data, which is the absolute time, and a clock error. Thus, all the time points in the in-vehicle device 1, the coordination device 2, and the infrastructure sensor 3 are synchronized with the absolute time point.

Figure 3B:
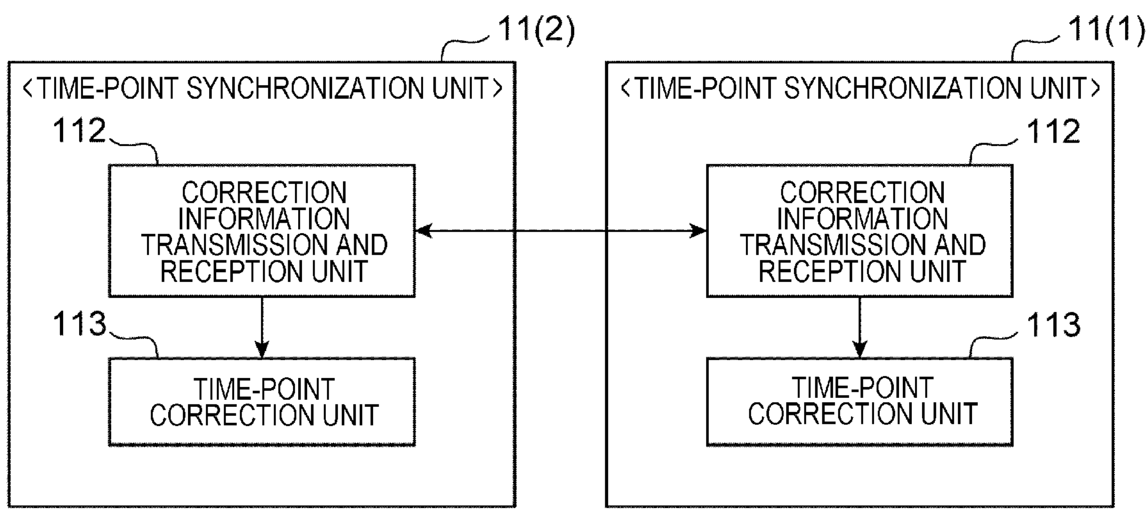
FIG. 3B is a diagram illustrating an example of a method of time-point synchronization in the in-vehicle device 1 and the coordination device 2.

FIG. 3B is a diagram illustrating an example of a method of synchronization in time-point with the in-vehicle device 1 and the coordination device 2. In this example, the time-point synchronization unit 11 of the in-vehicle device 1 includes a correction information transmission and reception unit 112 and a time-point correction unit 113. In addition, the time-point synchronization unit 11 of the coordination device 2 includes a correction information transmission and reception unit 112 and a time-point correction unit 113.

The correction information transmission and reception unit 112 in the time-point synchronization unit 11 of the in-vehicle device 1 transmits a communication message inquiring a time point in the coordination device 2 to the coordination device 2. The correction information transmission and reception unit 112 in the time-point synchronization unit 11 of the coordination device 2 receives the communication message from the in-vehicle device 1 and transmits time point information in the coordination device 2 to the in-vehicle device 1. The time-point correction unit 113 in the time-point synchronization unit 11 of the in-vehicle device 1 corrects the communication delay time with the coordination device 2 by measuring the time from the transmission of the communication message to the reception of the time point information from the coordination device 2. As a result, the time point in the in-vehicle device 1 is synchronized with the time point in the coordination device 2. Similarly, the time point in the coordination device 2 is also synchronized with the time point in the infrastructure sensor 3.

Note that it is sufficient that the time points in the in-vehicle device 1, the coordination device 2, and the infrastructure sensor 3 are synchronized with each other. Not only the method according to FIG. 3A or the method according to FIG. 3B but also a method by a combination thereof, a known time-point synchronization method using a system other than the GNSS, or the like may be used.

<Sensing Unit>

In the present example, a case where the infrastructure sensor 3 is assumed to be a camera of full high vision and a frame rate of 7 p will be described. The sensing unit 31 is a CMOS image sensor mounted in the infrastructure sensor 3, and receives seven images (frames) per second.

<Sensing Data>

Figure 4:
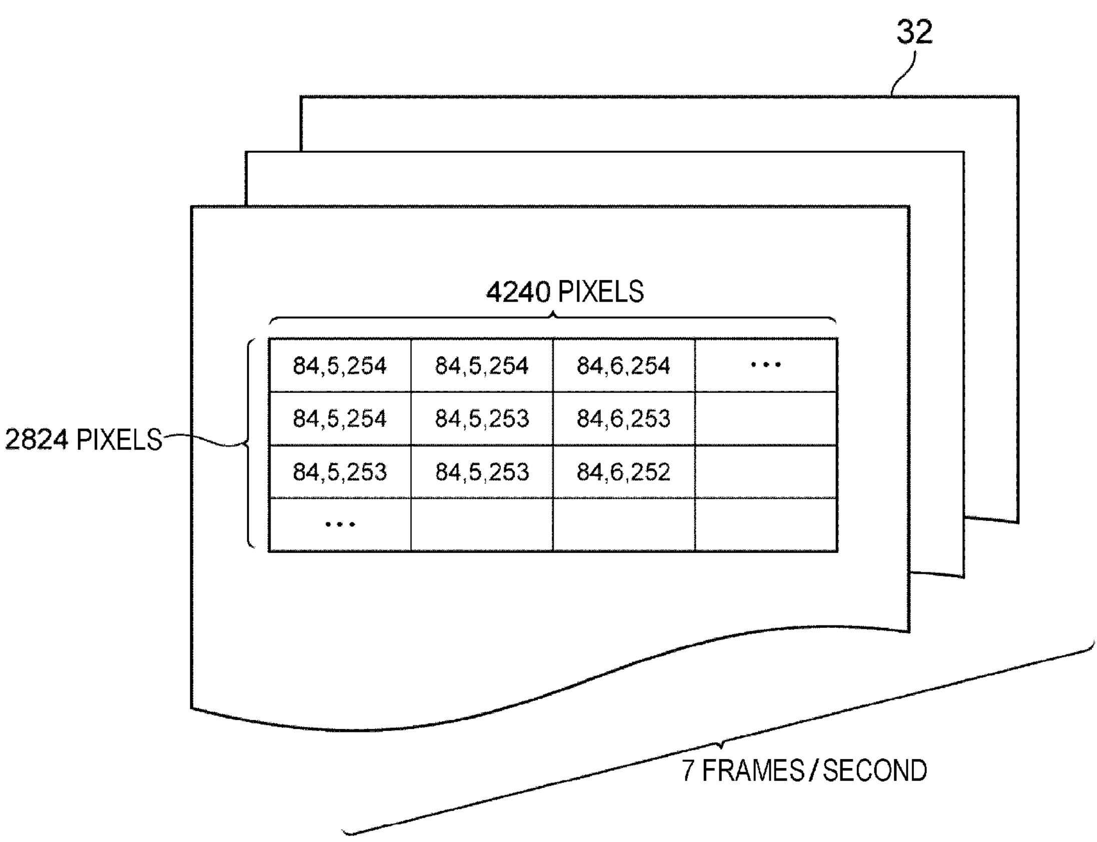
FIG. 4 is a diagram illustrating an example of sensing data 32.

FIG. 4 is a diagram illustrating an example of the sensing data 32 in the present example.

The sensing data 32 is a set of frames in which each pixel value (RGB) is expressed by an integer value of 0 to 255 in a two-dimensional array of 1920×1080 based on information received by the sensing unit 31 (CMOS image sensor) mounted in the infrastructure sensor 3. Seven frames are generated per second. The image may be compressed in a representation format (YUV) other than the above description or at the time of communication or encoding, and be decompressed as necessary. Alternatively, the image may be compressed into a predetermined video data format such as a moving picture experts group (MPEG) format.

<Sensing Data Transmission Unit>

The sensing data transmission unit 33 transmits the sensing data 32 to the coordination device 2.

<Sensing Data Reception Unit>

The sensing data reception unit 21 receives the sensing data 32 and transfers the received sensing data 32 to the travelable-time-added trajectory calculation unit 22.

<Travelable-Time-Added Trajectory Calculation Unit>

Figure 5:
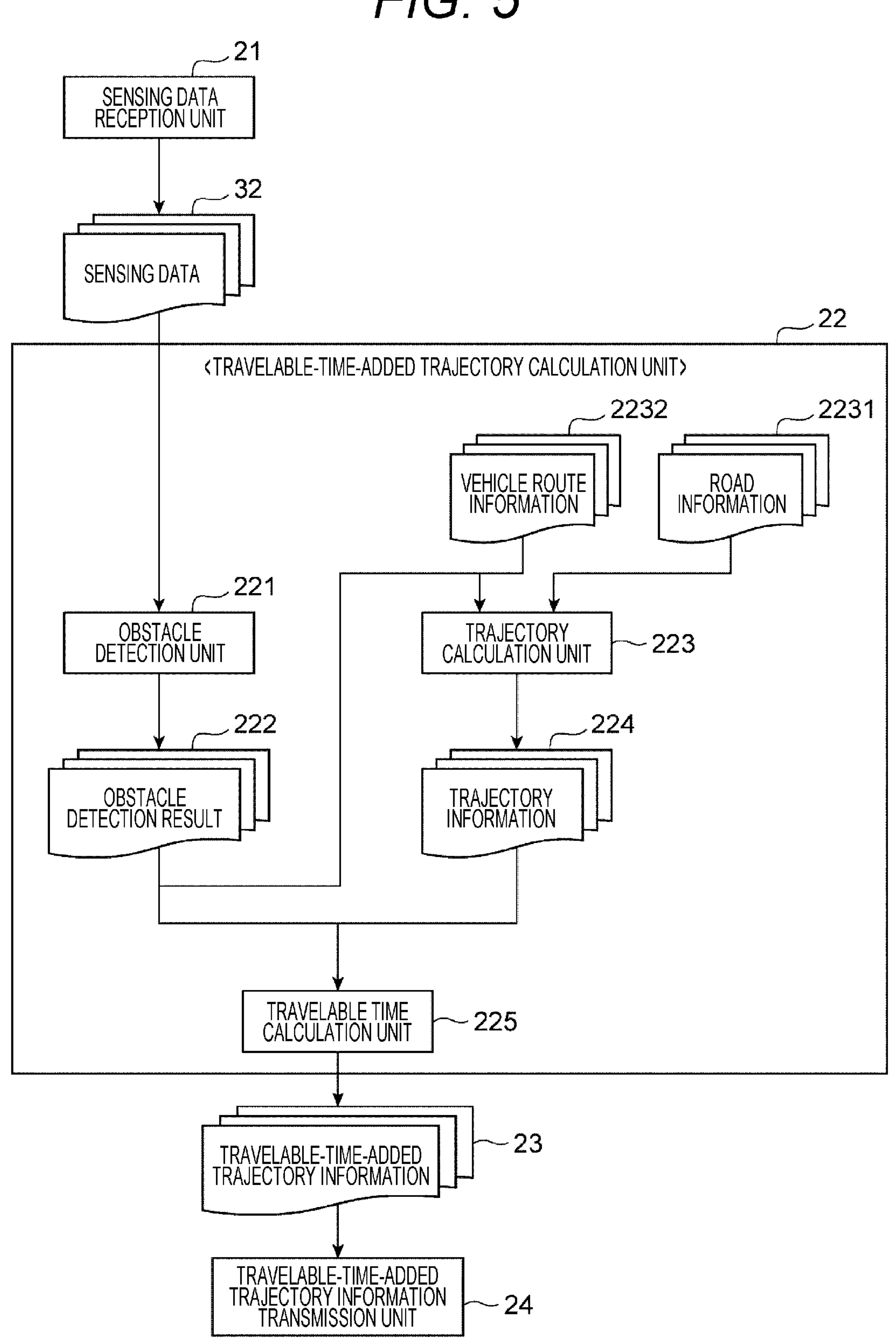
FIG. 5 is a diagram illustrating a functional block configuration and a processing flow of a travelable-time-added trajectory calculation unit 22 that receives the sensing data 32 as an input and outputs travelable-time-added trajectory information 23.

FIG. 5 is a diagram illustrating a functional block configuration and a processing flow of the travelable-time-added trajectory calculation unit 22 that receives the sensing data 32 as an input and outputs travelable-time-added trajectory information 23.

The travelable-time-added trajectory calculation unit 22 includes an obstacle detection unit 221, a trajectory calculation unit 223, and a travelable time calculation unit 225.

The obstacle detection unit 221 analyzes the sensing data 32 and generates an obstacle detection result 222 indicating whether there is an obstacle around the vehicle (in a target region through which the vehicle equipped with the in-vehicle device 1 passes) and the position of the obstacle (details will be described later).

On the other hand, the trajectory calculation unit 223 generates trajectory information 224 representing information of a travel trajectory to be followed in the vehicle control of the in-vehicle device 1 based on road information 2231 and one or both types of vehicle route information 2232 and the obstacle detection result 222 (details will be described later). The road information 2231 includes at least one of a road width, a road length, a curvature radius, and the number of lanes which are unique to a road of which the coordination device 2 is in charge. The vehicle route information 2232 includes a route to a destination of the vehicle equipped with the in-vehicle device 1.

Finally, the travelable time calculation unit 225 generates the travelable-time-added trajectory information 23 in which information indicating a time section in which the vehicle equipped with the in-vehicle device 1 can travel on each point (Way Point) on the travel trajectory included in the trajectory information 224 is added to each point (Way point) (details will be described later).

<Obstacle Detection Unit/Obstacle Detection Result>

Figure 6:
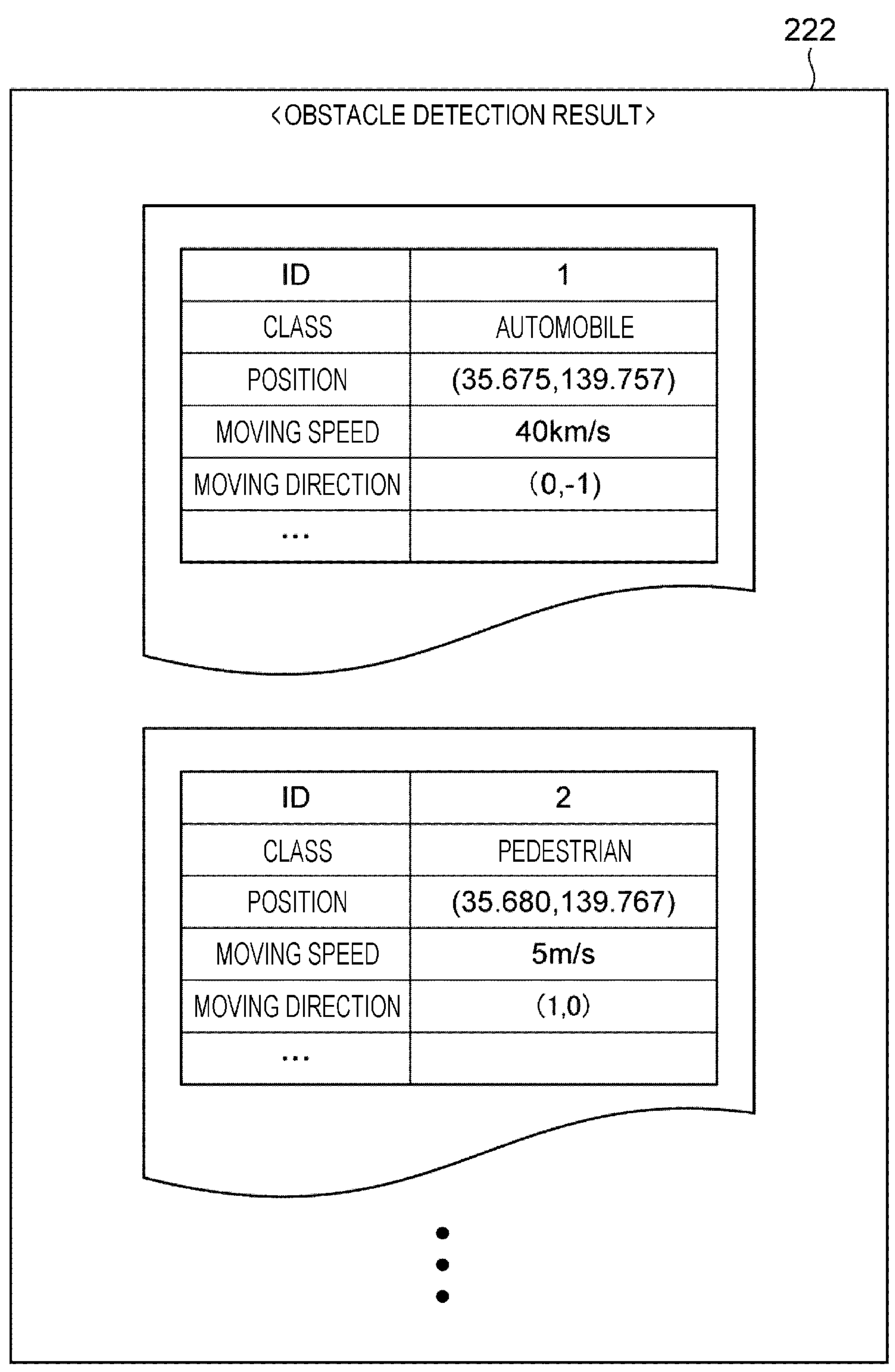
FIG. 6 is a diagram illustrating an example of an obstacle detection result 222 generated by an obstacle detection unit 221.

FIG. 6 is a diagram illustrating an example of the obstacle detection result 222 generated by the obstacle detection unit 221.

The obstacle detection unit 221 analyzes the sensing data 32 and calculates an identifier (ID), a type (class), coordinates (position), a moving speed, and a moving direction of an object included in the sensing data 32. For example, in the case of FIG. 6, an oncoming vehicle is detected as an obstacle of ID1, and a crossing pedestrian is detected as an obstacle of ID2, and the types are detected as an automobile and a pedestrian, respectively. Note that the moving direction is expressed by using a unit direction vector of a norm (L2 norm) 1 parallel to the xy coordinate plane in a coordinate system used in the infrastructure sensor 3. In order to identify an object from the sensing data 32 in a video data format, a deep neural network (DNN) or other known image recognition/processing techniques may be used.

<Trajectory Calculation Unit/Trajectory Information>

Figure 7:
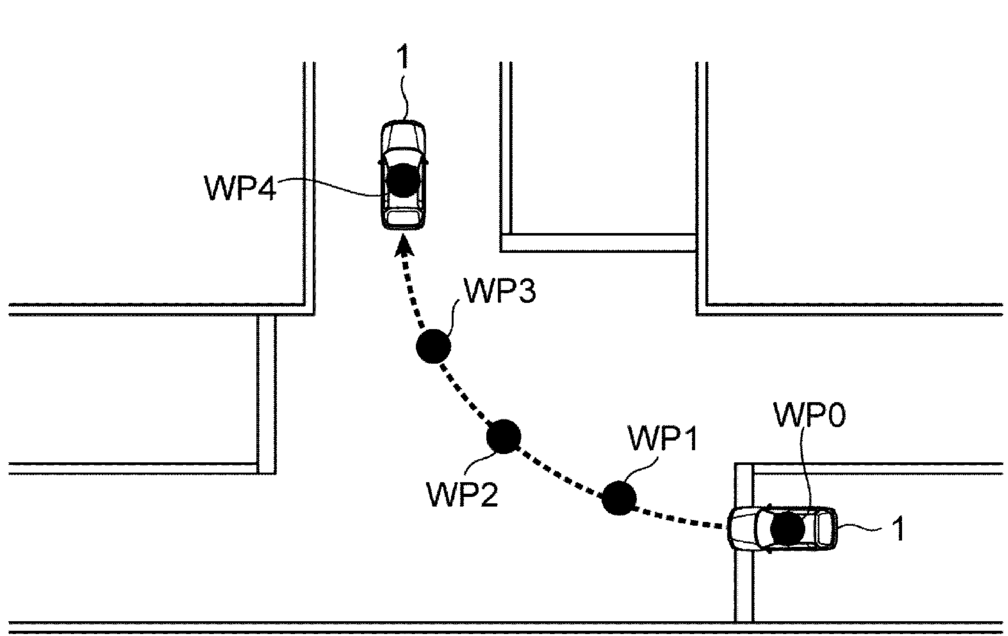
FIG. 7 is a diagram illustrating an example of trajectory information 224 generated by a trajectory calculation unit 223.

FIG. 7 is a diagram illustrating an example of the trajectory information 224 generated by the trajectory calculation unit 223.

The behavior of how the vehicle equipped with the in-vehicle device 1 proceeds can be understood from the detected moving direction of the vehicle in the obstacle detection result 222 or the vehicle route information 2232. Thus, the trajectory calculation unit 223 generates the trajectory information 224 representing information of the travel trajectory to be followed in the vehicle control of the in-vehicle device 1 based on the road information 2231 and one or both types of the obstacle detection result 222 and the vehicle route information 2232.

The generation of the trajectory information 224 may be realized by using a technique of detecting a white line from image data or other known techniques. The generated trajectory is expressed by a set of points on the trajectory, which are called a Way Point. For example, in the case of FIG. 7, the trajectory information 224 includes five Way Points on the generated trajectory. The five Way Points are numbered as WP0, WP1, . . . , and WP4 in order of proximity to the in-vehicle device 1. The coordinates (x coordinate, y coordinate) of each Way Point for WP0, . . . , and WP4 are designated.

Here, WP0 coincides with the current position of the in-vehicle device 1. A method of acquiring the current position of the in-vehicle device 1 may be either notification from the in-vehicle device 1 to the trajectory calculation unit 223 or identification by analyzing the sensing data 32.

Note that, regarding the coordinate system, any point in an orthogonal coordinate system, a polar coordinate system, or the like may be expressed. As long as the same point can be identified between the in-vehicle device 1, the coordination device 2, and the infrastructure sensor 3, any origin such as a road endpoint or a vehicle position may be set as the origin.

<Travelable Time Calculation Unit>

Figure 8:
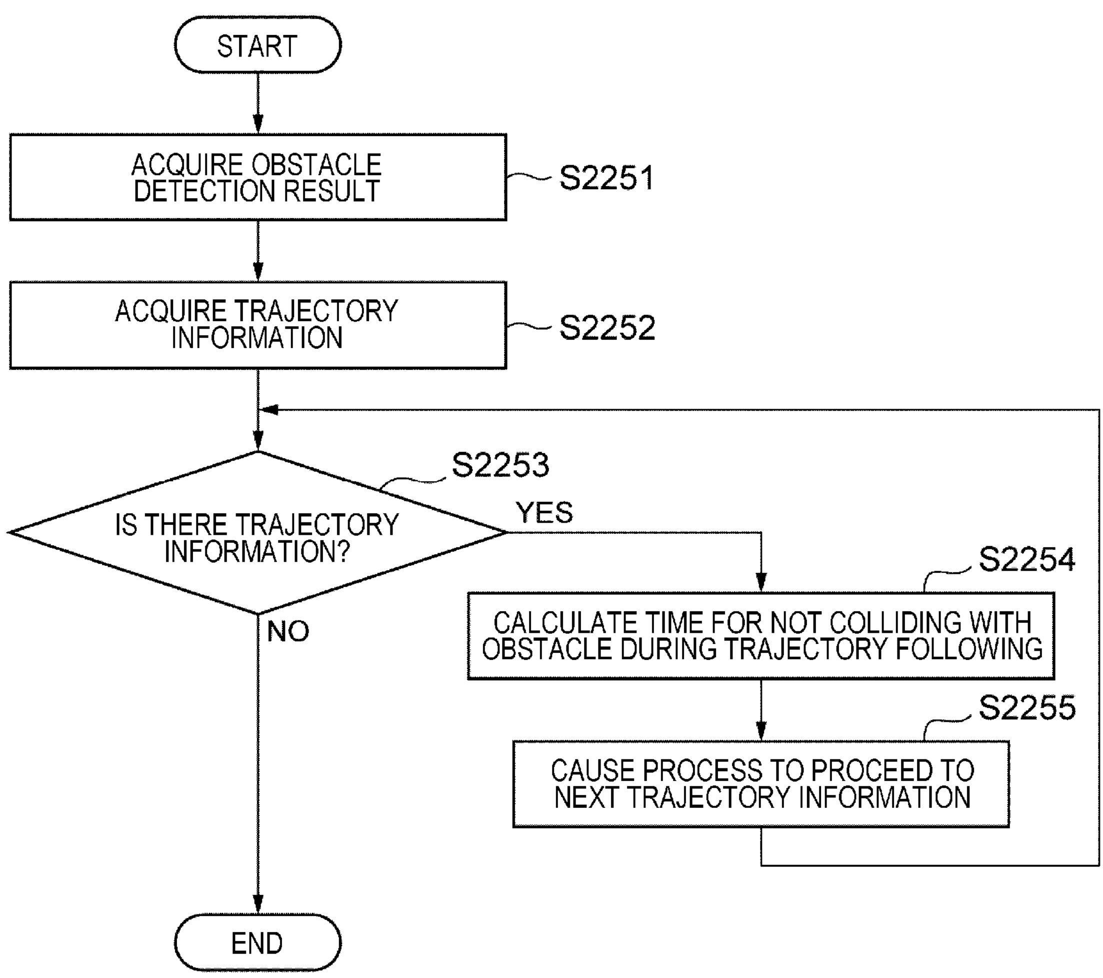
FIG. 8 is a diagram illustrating an outline of a processing flow of a travelable time calculation unit 225.

FIG. 8 is a diagram illustrating an outline of a processing flow of the travelable time calculation unit 225.

In Step S2251, an obstacle detection result 222 is acquired.

In Step S2252, trajectory information 224 is acquired.

In Step S2253, it is checked whether the acquired trajectory information 224 includes unprocessed trajectory information. When the unprocessed trajectory information is included, the process proceeds to Step S2254, and, when the unprocessed trajectory information is not included, the process is ended.

In Step S2254, time conditions (a travelable start time point and a travelable end time point) for not colliding with an obstacle during trajectory following (guaranteeing not to collide with the obstacle) are calculated (details will be described later).

In Step S2255, one piece of unprocessed trajectory information is selected from the trajectory information included in the acquired trajectory information 224, and the process proceeds to Step S2253.

According to such a procedure, the travelable time calculation unit 225 calculates the travelable time.

<Travelable-Time-Added Trajectory Information>

Figure 9:
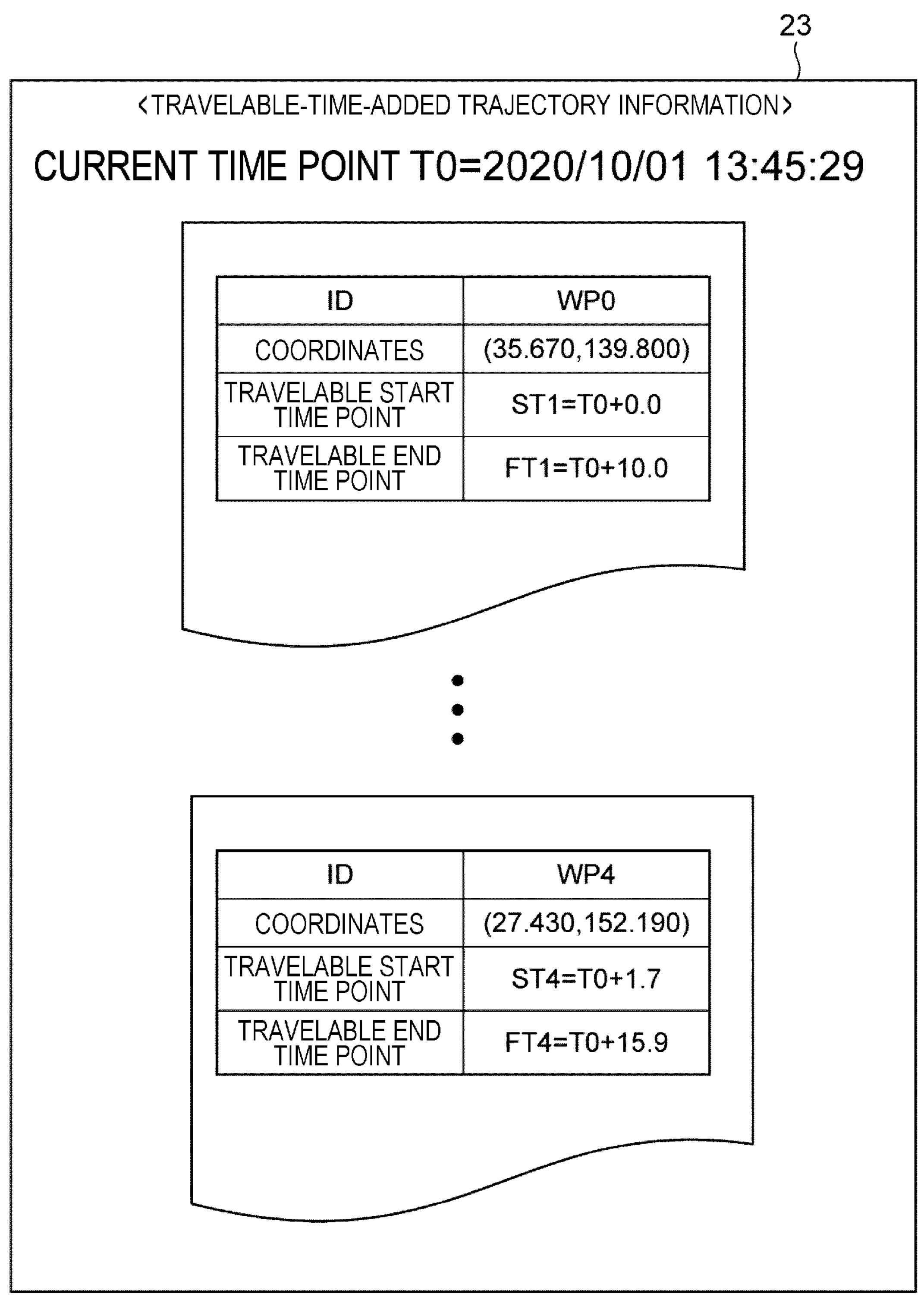
FIG. 9 is a diagram illustrating an example of travelable-time-added trajectory information 23 generated by the travelable time calculation unit 225.

FIG. 9 is a diagram illustrating an example of the travelable-time-added trajectory information 23 generated by the travelable time calculation unit 225. The travelable-time-added trajectory information 23 is trajectory information in which information of a time section in which the vehicle equipped with the in-vehicle device 1 may travel near a Way Point without an obstacle near the Way Point (guarantee that the vehicle does not collide with the obstacle) to each Way Point included in the trajectory information 224 generated by the trajectory calculation unit 223. The time section in which the vehicle may travel near the Way Point is expressed by a set of a travelable start time point (ST) and a travelable end time point (FT).

<Travelable Start Time Point/Travelable End Time Point>

Figure 10:
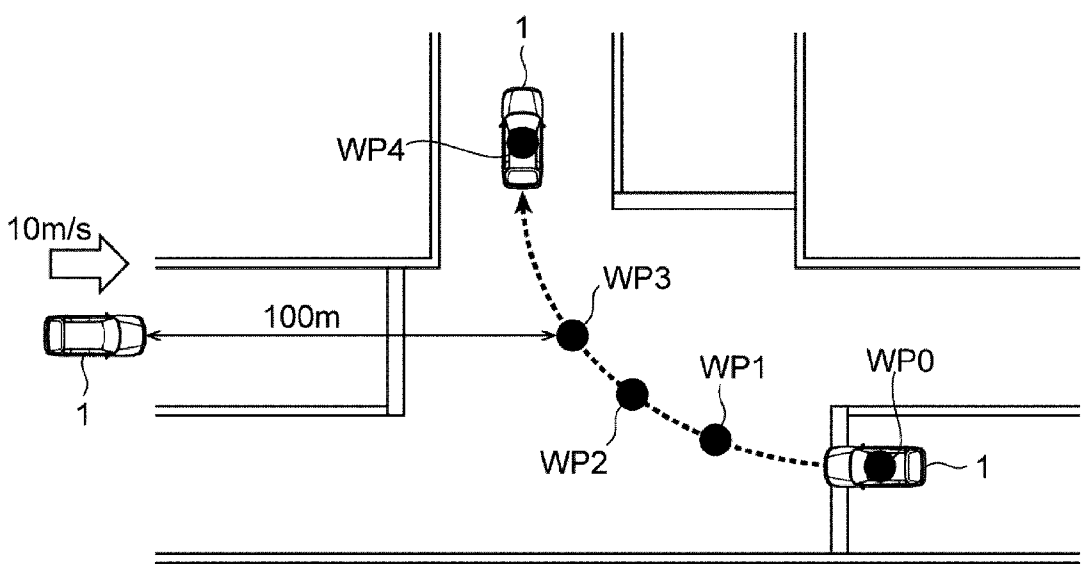
FIG. 10 is a diagram schematically illustrating the control system 0 and a surrounding situation in the example of FIG. 9.

FIG. 10 is a diagram schematically illustrating the control system 0 and a surrounding situation in the example of FIG. 9.

For each Way Point included in the trajectory information 224 calculated by the trajectory calculation unit 223, the travelable time calculation unit 225 refers to the obstacle detection result 222 to calculate the travelable start time point ST and the travelable end time point FT as a time section in which there is no obstacle at each Way Point. For example, as illustrated in FIG. 10, when an oncoming vehicle of which the moving direction coincides with WP3 or the surroundings of WP3 is detected at 100 m before WP3 and the moving speed is 10 m per second, the oncoming vehicle passes through WP3 after 10 seconds.

Therefore, it can be determined that the vehicle can travel within 10 seconds, and the vehicle cannot travel after 10 seconds. From the above description, with the current time point T0 as a reference, a travelable start time point ST3 of WP3 is set as T0, and a travelable end time point FT3 of WP3 is calculated as T0+10 seconds.

As described above, the travelable time calculation unit 225 calculates the travelable start time point ST and the travelable end time point FT based on the distance between the obstacle and each Way Point and the moving speed of the obstacle.

Note that, whether or not the moving directions match can be identified by using an inner product calculation of vectors in linear algebra.

In consideration of the margin time, for example, T_margin is set to 1 second, and FT3 may be set to (T0+(10−T_margin)) seconds. By considering the time margin, even though an error occurs in at least one of the coordinates, the moving speed, and the moving direction included in the obstacle detection result 222, the vehicle equipped with the in-vehicle device 1 can be prevented from colliding with an obstacle or the like within a range of the margin.

The travelable time calculation unit 225 similarly calculates the travelable start time point ST and the travelable end time point FT for the other Way Points.

<Travelable-Time-Added Trajectory Information Transmission Unit>

The travelable-time-added trajectory information transmission unit 24 transmits the travelable-time-added trajectory information 23 to the in-vehicle device 1.

<Travelable-Time-Added Trajectory Information Reception Unit>

The travelable-time-added trajectory information reception unit 12 receives the travelable-time-added trajectory information 23 and transfers the received travelable-time-added trajectory information 23 to the travelability determination unit 13.

<Travelability Determination Unit>

Figure 11:
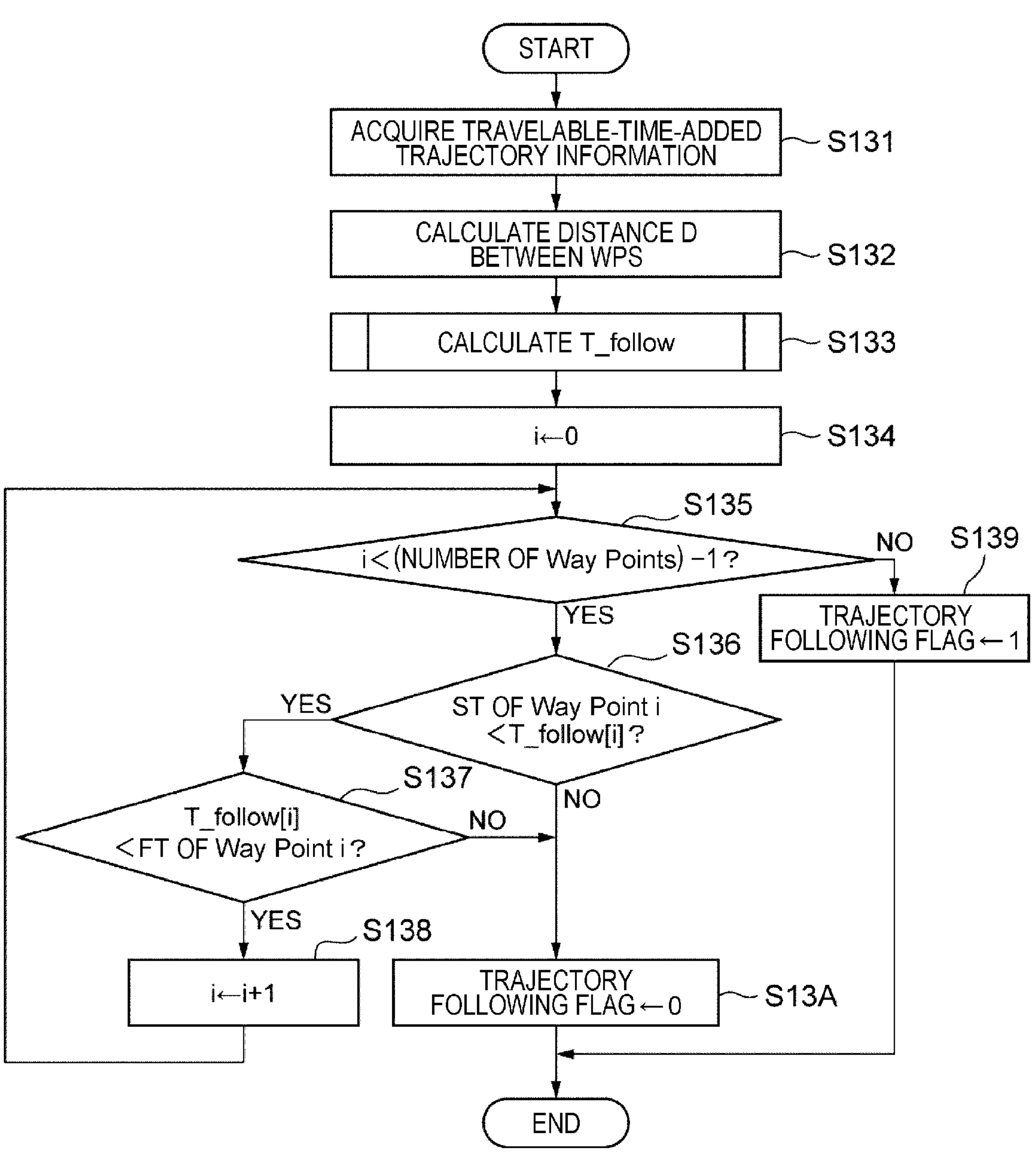
FIG. 11 is a diagram illustrating an outline of a processing flow of a travelability determination unit 13.

FIG. 11 is a diagram illustrating an outline of a processing flow of the travelability determination unit 13.

In Step S131, the travelable-time-added trajectory information 23 is acquired.

In Step S132, the distance D between the Way Points is calculated. When D is described as D={D[1], D[2], . . . , D[4]}, D[i] is described as a Euclidean distance between the Way Point i and the Way Point (i−1), the x coordinate of the Way Point i is described as x[i], and the y coordinate is described as y[i], D is calculated by the following (Expression 1).

$$D[i] = \sqrt{(x[i] - x[i-1])^2 * (y[i] - y[i]1])^2} \qquad \text{[Math. 1]}$$

In Step S133, a time point T_follow at which the vehicle equipped with the in-vehicle device 1 reaches each Way Point is calculated. T_follow={T_follow[1], T_follow[2], . . . , T_follow[4]}, and T_follow[i] represents a time point at which the vehicle reaches the Way Point i. A method of obtaining T_follow will be described later.

In Step S134, 0 is substituted into an index i of the Way Point to be processed.

In Step S135, the magnitudes of the index i and (the number of Way Points−1) are compared with each other. When the index i is smaller, the process proceeds to Step S136, and otherwise, the process proceeds to Step S139.

In Step S136, an anteroposterior relationship between the travelable start time point ST of the Way Point i and the time point of T_follow[i] is compared. When ST is earlier (closer to the current time point), the process proceeds to Step S137, and otherwise the process proceeds to Step S13A.

In Step S137, an anteroposterior relationship between the travelable end time point FT of the Way Point i and the time point of T_follow[i] is compared. When T_follow[i] is earlier (closer to the current time point), the process proceeds to Step S138. Otherwise, the process proceeds to Step S13A.

In Step S138, 1 is added to the index i, and the process proceeds to Step S135.

In Step S139, 1 is substituted into a trajectory following flag.

In Step S13A, 0 is substituted into the trajectory following flag.

According to the above processing flow, the travelability determination unit 13 can determine whether or not the vehicle equipped with the in-vehicle device 1 can travel (between ST and FT) with satisfying the travelable start time point ST and the travelable end time point FT set to each Way Point on the travel trajectory, in other words, determine the validity of the travelable start time point ST and the travelable end time point FT forming the travelable time.

Note that, in consideration of the time margin T_margin, in the determination in Steps S136 and S137, T_follow may be compared with (ST+T_margin) or (FT−T_margin). By considering the time margin, even when a large amount of time is required for the calculation process or when an error occurs in trajectory tracking, it is possible to cause the vehicle equipped with the in-vehicle device 1 to travel such that the vehicle does not collide with an obstacle or the like within the range of the margin.

<T_follow Calculation>

Figure 12:
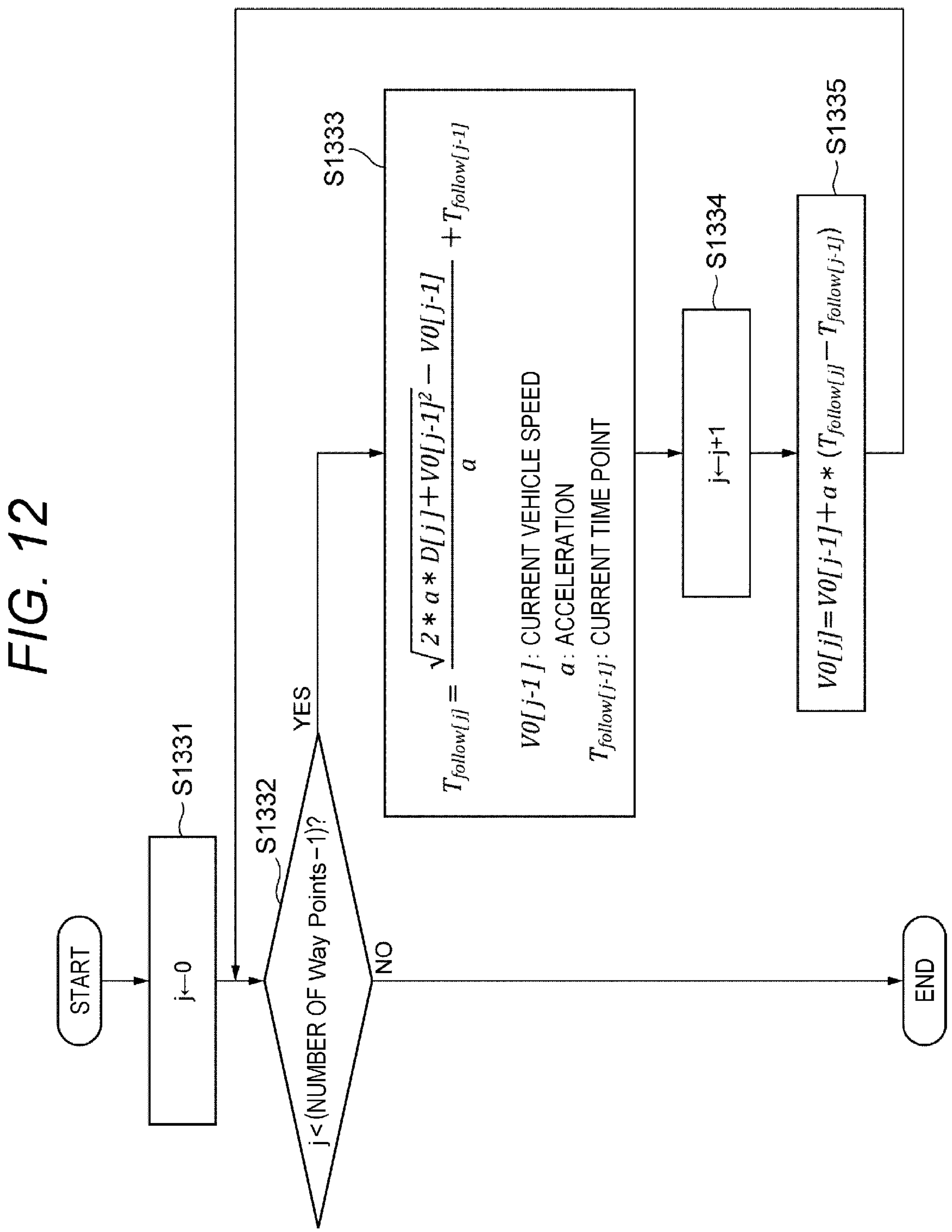
FIG. 12 is a diagram illustrating an outline of a T_follow calculation process of the travelability determination unit 13.

FIG. 12 is a diagram illustrating an outline for a T_follow calculation process (Step S133 in FIG. 11) of the travelability determination unit 13.

In Step S1331, 0 is substituted into an index j representing the Way Point to be processed.

In Step S1332, the magnitudes of the index j and (the number of Way Points−1) are compared with each other. When the index j is smaller, the process proceeds to Step S1333, and otherwise, the process is ended.

In Step S1333, T_follow[j] is calculated.

T_follow[j] is a time point at which the vehicle equipped with the in-vehicle device 1 arrives at the Way Point j. The time required to travel between the Way Points separated by the distance D[j] (D[j] is a distance between the Way Point (j−1) and the Way Point j) by the constant acceleration motion at the initial speed V0[j−1] (speed of the vehicle equipped with the in-vehicle device 1 in the Way Point (j−1)) and the acceleration a of the vehicle equipped with the in-vehicle device 1 is the following (Expression 2).

$$\frac{\sqrt{2*a*D[j]+V0[j-1]^2}-V0[j-1]}{a} \quad \text{[Math. 2]}$$

Therefore, it is possible to calculate the time point T_follow[j] at which the vehicle equipped with the in-vehicle device 1 arrives at the Way Point j, by adding the above (Expression 2) to T_follow[j−1] which is the time point at which the vehicle departs from the Way Point (j−1), as in the following (Expression 3).

$$T_{follow[j]}=\frac{\sqrt{2*a*D[j]+V0[j-1]^2}-V0[j-1]}{a}+T_{follow[j-1]} \quad \text{[Math. 3]}$$

Here, T_follow[0] is the time point in the in-vehicle device 1 at the moment when the travelability determination unit 13 starts the calculation of T_follow. V0[0] is the current speed of the vehicle equipped with the in-vehicle device 1 in WP0. T_follow[0] and V0[0] are measured by the in-vehicle device 1.

Further, the acceleration a of the vehicle equipped with the in-vehicle device 1 can be freely set by the in-vehicle device 1, and may be, for example, a value obtained by multiplying the maximum design acceleration of the vehicle equipped with the in-vehicle device 1 by 0.8.

In Step S1334, 1 is added to the index j.

In Step S1335, the speed V0[j] of the vehicle equipped with the in-vehicle device 1 at the Way Point j is calculated. This can be calculated as the following (Expression 4) by using the speed V0[j−1] of the vehicle equipped with the in-vehicle device 1 at the previous Way Point j−1, and T_follow[j] and T_follow[j−1] calculated in Step S1333.

$$V0[j]=V0[j-1]+a*(T_{follow[j]}-T_{follow[j-1]}) \quad \text{[Math. 4]}$$

After calculating the speed V0[j] of the vehicle equipped with the in-vehicle device 1, the process proceeds to Step S1332.

It should be noted that, in the calculation flow of T_follow described above, the calculation of the arrival time point T_follow of each Way Point is performed starting from T_follow[0], which is the time point (the time point in the in-vehicle device 1) at which the calculation is started after the arrival of the travelable-time-added trajectory information 23 at the travelability determination unit 13. As a result, the travelability determination unit 13 performs determination based on the communication delay actually occurring between the in-vehicle device 1 and the coordination device 2, and the vehicle equipped with the in-vehicle device 1 can complete traveling (trajectory following) within a time in which the coordination device 2 guarantees safety.

In addition, when an obstacle or the like is not approaching each Way Point, a travelable time section (time between ST and FT) becomes long. Therefore, even though the communication delay occurs longer than usual, when the travelability determination unit 13 substitutes 1 into the trajectory following flag in accordance with the processing flow of FIG. 11, the in-vehicle device 1 can perform trajectory following.

<Trajectory Following Unit>

Figure 13:
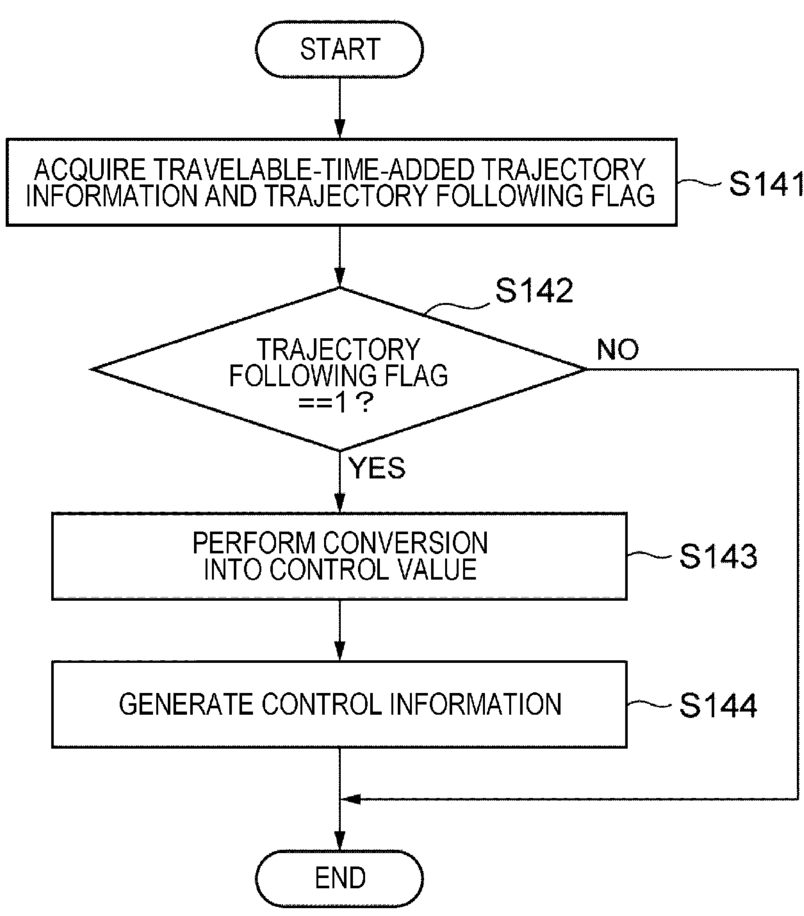
FIG. 13 is a diagram illustrating an outline of a processing flow in a trajectory following unit 14.

FIG. 13 is a diagram illustrating an outline of a processing flow in the trajectory following unit 14.

In Step S141, the travelable-time-added trajectory information 23 and the trajectory following flag are acquired.

In Step S142, it is checked whether or not the trajectory following flag is 1. When the trajectory following flag is 1 (that is, when the vehicle equipped with the in-vehicle device 1 can travel (between ST and FT) with satisfying the travelable start time point ST and the travelable end time point FT set to each Way Point on the travel trajectory, in other words, when the travelable start time point ST and the travelable end time point FT forming the travelable time are valid), the process proceeds to Step S143. When the trajectory following flag is not 1 (that is, when the vehicle equipped with the in-vehicle device 1 satisfies the travelable start time point ST and the travelable end time point FT set to each Way Point on the travel trajectory (between ST and FT) and cannot travel, in other words, when the travelable start time point ST and the travelable end time point FT forming the travelable time are not valid), the process is ended.

In Step S143, the acquired travelable-time-added trajectory information 23 is converted into a control value.

In Step S144, the control value generated in Step S143 is output as control information 19.

Determination of the control value in Step S143 and generation of the control information 19 in Step S144 can be realized by a method installed on known advanced driver-assistance systems.

According to the above processing flow, the trajectory following unit 14 can perform the trajectory following control (permit the in-vehicle device 1 to follow the travel trajectory) only when the travelability determination unit 13 determines that the trajectory following is possible.

<Operational Effects>

As described above, the control system 0 according to Example 1 includes the in-vehicle device 1 and the coordination device 2 that are synchronized in time point. The control system 0 includes the travelable time calculation unit 225 that calculates the travelable time for guaranteeing that a vehicle does not collide with an obstacle on a travel trajectory in a target region through which the vehicle equipped with the in-vehicle device 1 passes, the travelability determination unit 13 that determines validity of the travelable time, and the trajectory following unit 14 that permits the in-vehicle device 1 to follow the travel trajectory when it is determined that the travelable time is valid.

In addition, the travelability determination unit 13 determines whether or not the vehicle equipped with the in-vehicle device 1 is able to travel by satisfying a travelable start time point and a travelable end time point that form the travelable time and are set at the respective points on the travel trajectory.

In other words, the control system 0 in Example 1 includes means for performing synchronization in time point between the coordination device 2 and the in-vehicle device 1, means for calculating a time section for guaranteeing that the vehicle equipped with the in-vehicle device 1 does not collide with an obstacle in a travel trajectory through which the vehicle equipped with the in-vehicle device 1 is scheduled to pass, means for determining whether or not the vehicle equipped with the in-vehicle device 1 can travel while satisfying the time section, based on the communication delay that has occurred until the in-vehicle device 1 receives travel trajectory information from the coordination device 2, and means for causing the in-vehicle device 1 to follow the travel trajectory information when the determination indicates being travelable.

According to Example 1, there are effects that the safety of the vehicle control is guaranteed by performing the vehicle control in consideration of the delay actually occurring in the communication between the in-vehicle device 1 and the coordination device 2, and the number of times of decelerating and stopping the vehicle equipped with the in-vehicle device 1 is suppressed by lengthening the allowable communication delay time when there is no obstacle or the like on the travel trajectory and when there is no approaching obstacle or the like.

Example 2

A control system and a control method according to Example 2 of the present invention will be described. The difference from Example 1 is that a request to assist automatic driving can be issued from the in-vehicle device 1 to the coordination device 2. Note that the similar components to those of Example 1 are denoted by the same reference signs, and the description thereof will be omitted.

<Configuration of Control System>

Figure 14:
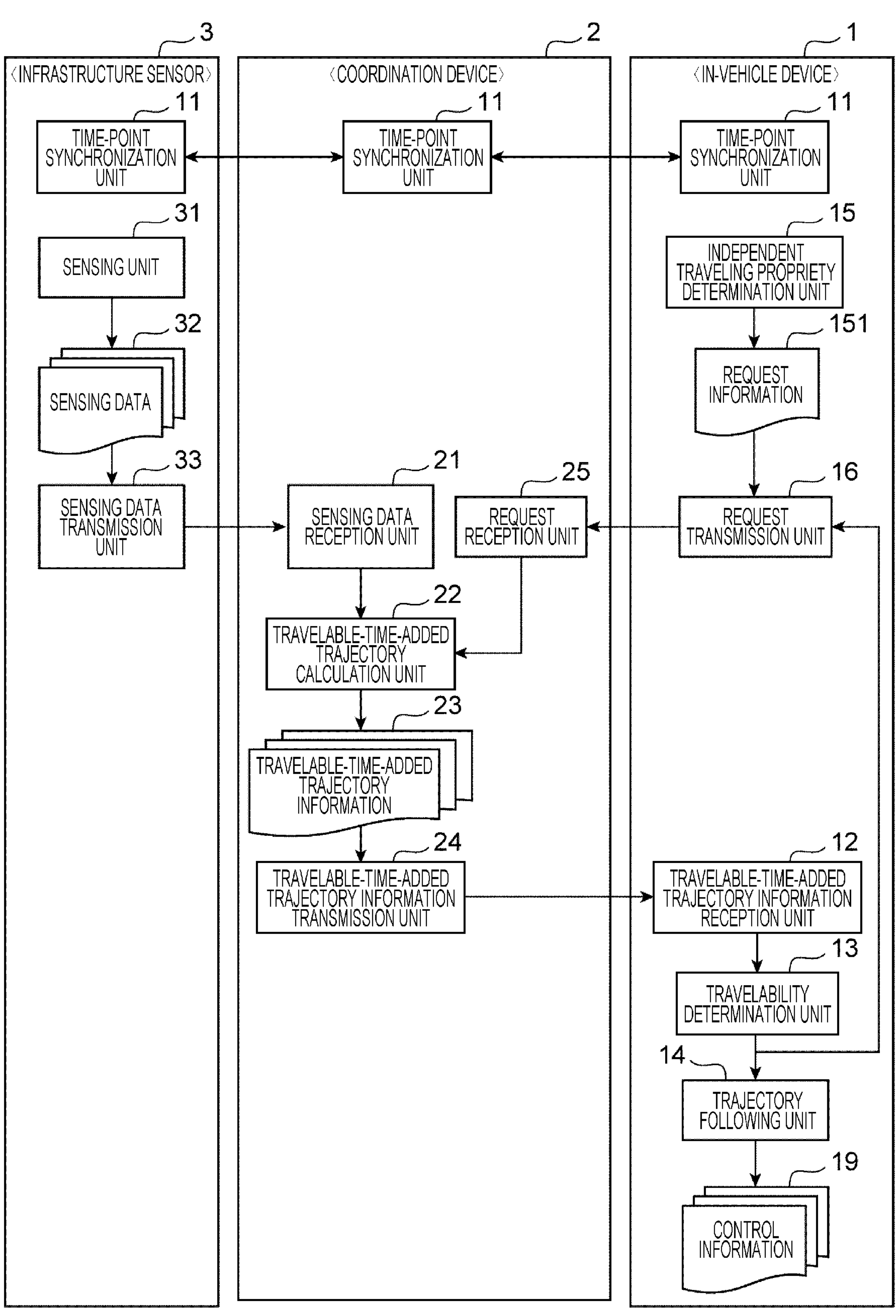
FIG. 14 is a diagram illustrating a functional block configuration of a control system 0 according to Example 2.

FIG. 14 is a diagram illustrating a functional block configuration of a control system 0 including an in-vehicle device 1, a coordination device 2, and an infrastructure sensor 3 in Example 2. The configuration of the infrastructure sensor 3 is similar to that in Example 1. The in-vehicle device 1 includes an independent traveling propriety determination unit 15 and a request transmission unit 16 as constituent elements in addition to the constituent elements in Example 1, and the coordination device 2 includes a request reception unit 25 as a constituent element in addition to the constituent elements in Example 1.

<Request Information>

Figure 15:
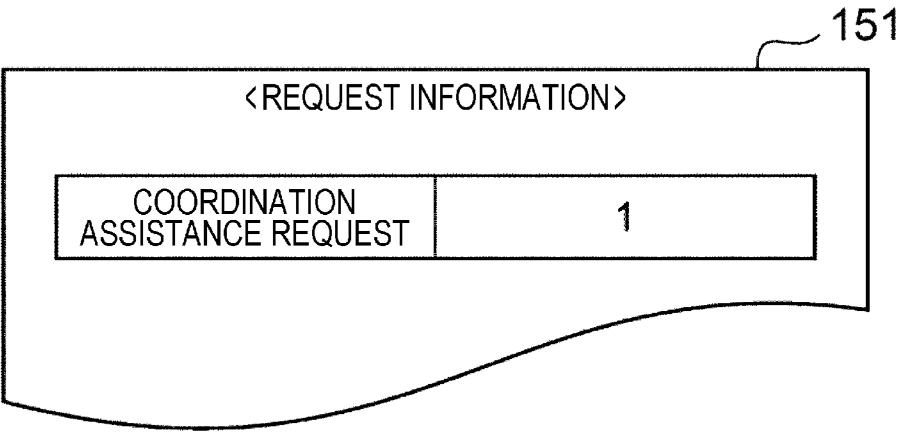
FIG. 15 is a diagram illustrating an example of request information 151 generated by an independent traveling propriety determination unit 15.

FIG. 15 is a diagram illustrating an example of request information 151 generated by the independent traveling propriety determination unit 15. The request information 151 includes a flag indicating whether or not to request the coordination device 2 to assist the vehicle control.

<Independent Traveling Propriety Determination Unit/Request Transmission Unit>

The independent traveling propriety determination unit 15 determines whether or not the vehicle equipped with the in-vehicle device 1 can travel alone. For example, from route information to a destination and the current position of the vehicle, it is determined whether or not the vehicle can travel alone (in other words, whether or not there is an action that the vehicle equipped with the in-vehicle device 1 cannot safely perform (travel) alone), by determining that the vehicle having a lane keeping function cannot travel alone due to a right or left turn or the like, or the vehicle cannot travel alone due to a broken sensor of the vehicle. Regarding the determination, for example, in accordance with a conventionally known method, it may be determined whether the vehicle can travel based on at least any one type of position information of the vehicle equipped with the in-vehicle device 1, surrounding travel environment information, and a travel plan. Alternately, it may be determined whether the vehicle can travel from map data including information regarding a shape of a road and an intersection.

When the independent traveling propriety determination unit 15 determines that the independent traveling is not possible, the request transmission unit 16 transmits the request information 151 illustrated in FIG. 15 to the coordination device 2. The request information 151 includes a flag indicating whether or not assistance by the coordination device 2 is necessary. The request transmission unit 16 substitutes 1 into the flag (of the request information 151 generated by the independent traveling propriety determination unit 15) and transmits the request information 151 to the coordination device 2.

In addition, when the independent traveling propriety determination unit 15 determines that the vehicle cannot follow the travelable-time-added trajectory information 23 received from the coordination device 2 by the travelability determination unit 13, the request transmission unit 16 may output a request to the coordination device 2. This has an effect of enabling the coordination device 2 to re-generate the travelable-time-added trajectory information 23 using the latest sensing data 32 and transmit the re-generated travelable-time-added trajectory information 23 to the in-vehicle device 1 when the communication between the in-vehicle device 1 and the coordination device 2 is greatly delayed, and the vehicle can travel at the time calculated by the coordination device 2, but the vehicle cannot travel at the time when the information arrives at the in-vehicle device 1, due to an approach of an obstacle or the like to the vehicle equipped with the in-vehicle device 1.

<Request Reception Unit>

The request reception unit 25 receives the request information 151 from the in-vehicle device 1, and inputs the request information 151 to the travelable-time-added trajectory calculation unit 22. As a result, the coordination device 2 generates the above-described travelable-time-added trajectory information 23 (including the travelable start time point ST and the travelable end time point FT in the travel trajectory) (in response to the request from the in-vehicle device 1), and the travelable-time-added trajectory information transmission unit 24 transmits the generated travelable-time-added trajectory information 23 to the in-vehicle device 1.

<Operational Effects>

As described above, the control system 0 according to Example 2 further includes the independent traveling propriety determination unit 15 that determines, from the travel trajectory, whether or not there is an action that the vehicle equipped with the in-vehicle device 1 alone cannot safely perform (travel), and the request transmission unit 16 that requests the travelable time including a travelable start time point and a travelable end time point on the travel trajectory to the coordination device 2 when it is determined that there is the action that cannot be performed.

According to Example 2, if there is no request from the in-vehicle device 1 side, the coordination device 2 does not need to calculate the travelable-time-added trajectory information 23, so that it is possible to reduce the processing load of the coordination device 2. In addition, since the communication between the in-vehicle device 1 and the coordination device 2 is limited to when there is the request from the in-vehicle device 1, it is possible to reduce the number and frequency of communications between the in-vehicle device 1 and the coordination device 2 and to continue control (trajectory following) while reducing the influence on vehicle control due to the communication load and the communication delay.

Example 3

A control system and a control method according to Example 3 of the present invention will be described. The difference from Example 1 is that, when the vehicle equipped with an in-vehicle device 1 is urgently stopped, the vehicle equipped with the in-vehicle device 1 continues driving by using only the coordinate information of the Way Point regardless of the travelable start time point ST and the travelable end time point FT. Note that the similar components to those of Example 1 are denoted by the same reference signs, and the description thereof will be omitted.

<Configuration of Control System>

Figure 16:
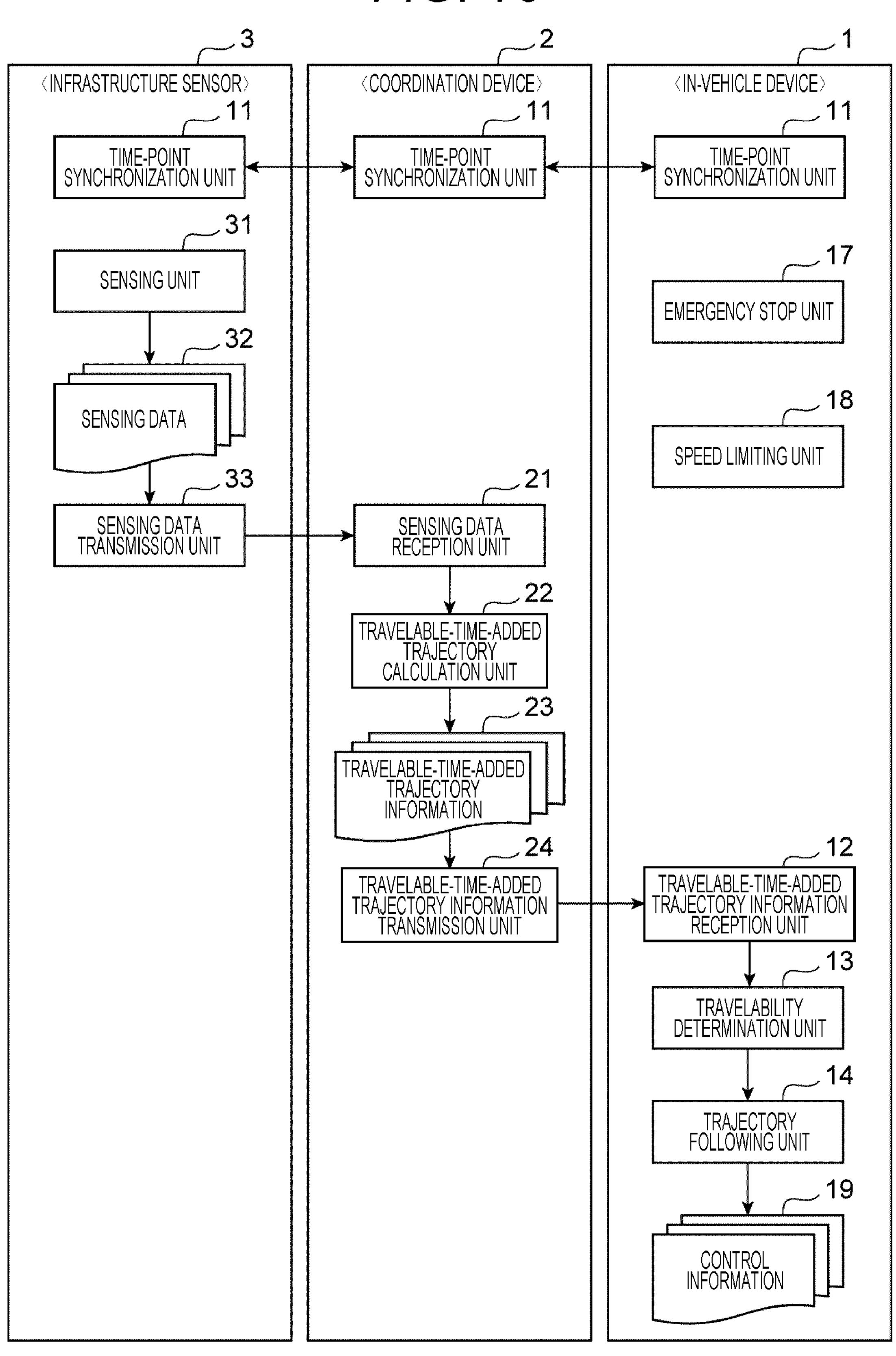
FIG. 16 is a diagram illustrating a functional block configuration of a control system 0 according to Example 3.

FIG. 16 is a diagram illustrating a functional block configuration of a control system 0 including an in-vehicle device 1, a coordination device 2, and an infrastructure sensor 3 in Example 3.

The in-vehicle device 1 in Example 3 further includes an emergency stop unit 17 and a speed limiting unit 18 in addition to the constituent elements in Example 1.

<Emergency Stop Unit>

The emergency stop unit 17 has a function of, when the in-vehicle device 1 approaches a certain obstacle and a collision is predicted, applying the brake regardless of the presence or absence of trajectory following to urgently stop the vehicle equipped with the in-vehicle device 1. A method of predicting the collision and applying the brake can be implemented by a method installed on known advanced driver-assistance systems.

<Speed Limiting Unit>

The speed limiting unit 18 has a function of limiting the maximum speed of the vehicle equipped with the in-vehicle device 1 and a function of releasing the limitation. In the present example, the maximum speed when the speed is limited is set to 5 km/h so that the vehicle can immediately stop when an obstacle is detected. Note that, in the present example, the maximum speed is set to 5 km/h, but the present example is not limited thereto. A method of limiting the maximum speed may be any method such as known digital tachograph, and is not directly related to the present example. Thus, a detailed description of the method will be omitted.

<Travelability Determination Unit>

Figure 17:
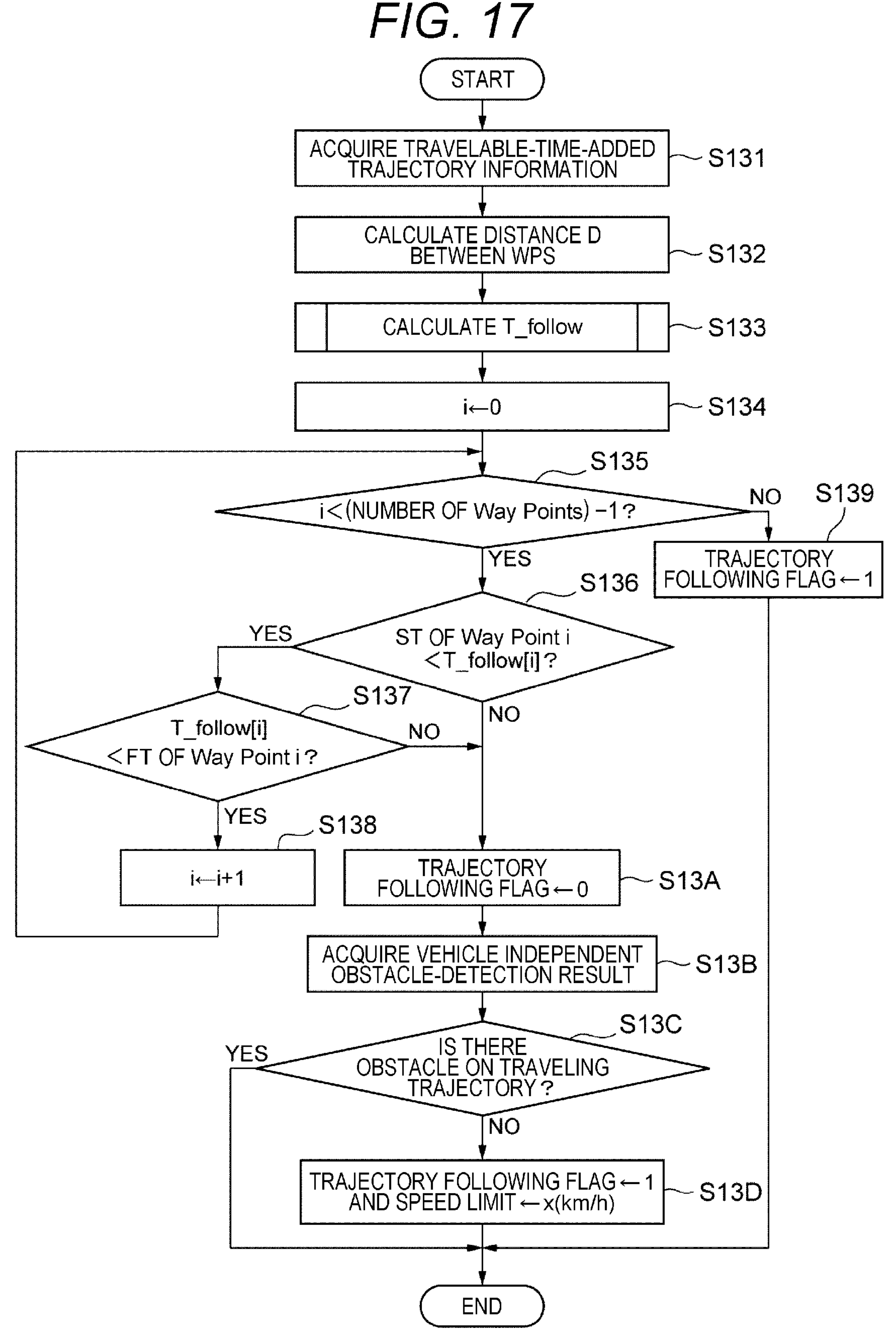
FIG. 17 is a diagram illustrating an outline of a processing flow of a travelability determination unit 13 in Example 3.

FIG. 17 is a diagram illustrating an outline of a processing flow of a travelability determination unit 13 in Example 3. Steps S131 to S139 and S13A in FIG. 17 are the same as Steps S131 to S139 and S13A in FIG. 11 described in Example 1.

In Step S13B, a vehicle independent obstacle-detection result is acquired.

In Step S13C, it is checked whether or not there is an obstacle on the travel trajectory from the acquired vehicle independent obstacle-detection result. When there is the obstacle on the travel trajectory, the process is ended. When there is no obstacle on the travel trajectory, the process proceeds to Step S13D.

In Step S13D, the speed limit of the vehicle equipped with the in-vehicle device 1 is set to any speed, and 1 is substituted into the trajectory following flag.

According to the above processing flow, for example, when it is determined that the trajectory following cannot be started or ended within the travelable time due to the emergency stop determined by the emergency stop unit 17 of the in-vehicle device 1 during following of the travel trajectory (in other words, the travelable start time point ST and the travelable end time point FT of the travelable time on the current travel trajectory cannot be maintained), if there is no obstacle on the travel trajectory (that is, after the emergency stop condition is released), the maximum speed of the vehicle equipped with the in-vehicle device 1 can be instructed to be limited by the speed limiting unit 18 regardless of the travelable start time point ST and the travelable end time point FT of the travelable time. Then, (the trajectory following unit 14 of) the in-vehicle device 1 can continue the automatic driving alone by passing through the travel trajectory while decelerating (traveling at a low speed).

<Operational Effects>

As described above, in the control system 0 according to Example 3, when the travelable time of the current travel trajectory cannot be maintained due to an emergency stop of the vehicle equipped with the in-vehicle device 1 while following the travel trajectory, after a condition of the emergency stop is released (if there is no obstacle on the travel trajectory), the trajectory following unit 14 causes the vehicle equipped with the in-vehicle device 1 to pass through the travel trajectory while decelerating, regardless of the travelable time.

According to Example 3, when the vehicle equipped with the in-vehicle device 1 stops and stands by until an obstacle or the like retreats after the occurrence of the emergency stop, and thus the travelable start time point ST and the travelable end time point FT of the travelable time are not satisfied, the vehicle travels on the travel trajectory by slowly traveling (deceleration or low-speed traveling) while eliminating the need for re-communication with the coordination device 2 and re-calculation by the coordination device 2, so that it is possible to continue vehicle control while securing the safety and to avoid an occurrence of a delay due to re-communication and re-calculation.

Example 4

A control system and a control method according to Example 4 of the present invention will be described. The difference from Example 1 is that the coordination device 2 generates the travelable-time-added trajectory information in consideration of the travelable-time-added trajectory information generated for another vehicle linked with the coordination device 2. Note that the similar components to those of Example 1 are denoted by the same reference signs, and the description thereof will be omitted.

<Configuration of Control System>

Figure 18:
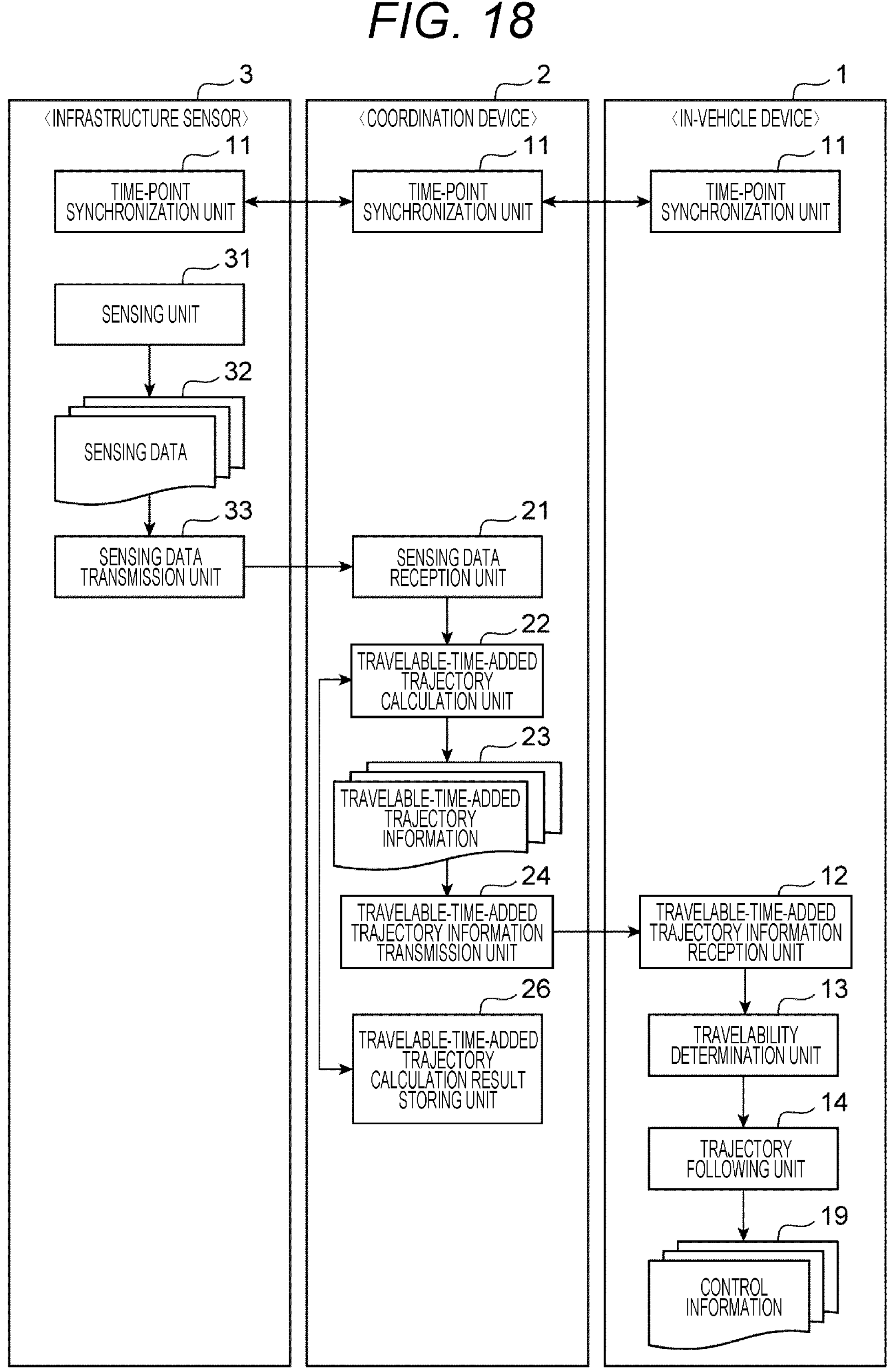
FIG. 18 is a diagram illustrating a functional block configuration of a control system 0 according to Example 4.

FIG. 18 is a diagram illustrating a functional block configuration of a control system 0 including an in-vehicle device 1, a coordination device 2, and an infrastructure sensor 3 in Example 4.

The coordination device 2 in Example 4 further includes a travelable-time-added trajectory calculation result storing unit 26 as a constituent element in addition to the constituent elements in Example 1.

<Travelable-Time-Added Trajectory Calculation Result Storing Unit>

The travelable-time-added trajectory calculation result storing unit 26 stores travelable-time-added trajectory information 23 (of a plurality of vehicles to be controlled) generated (calculated) by a travelable-time-added trajectory calculation unit 22.

<Travelable-Time-Added Trajectory Calculation Unit>

Figure 19:
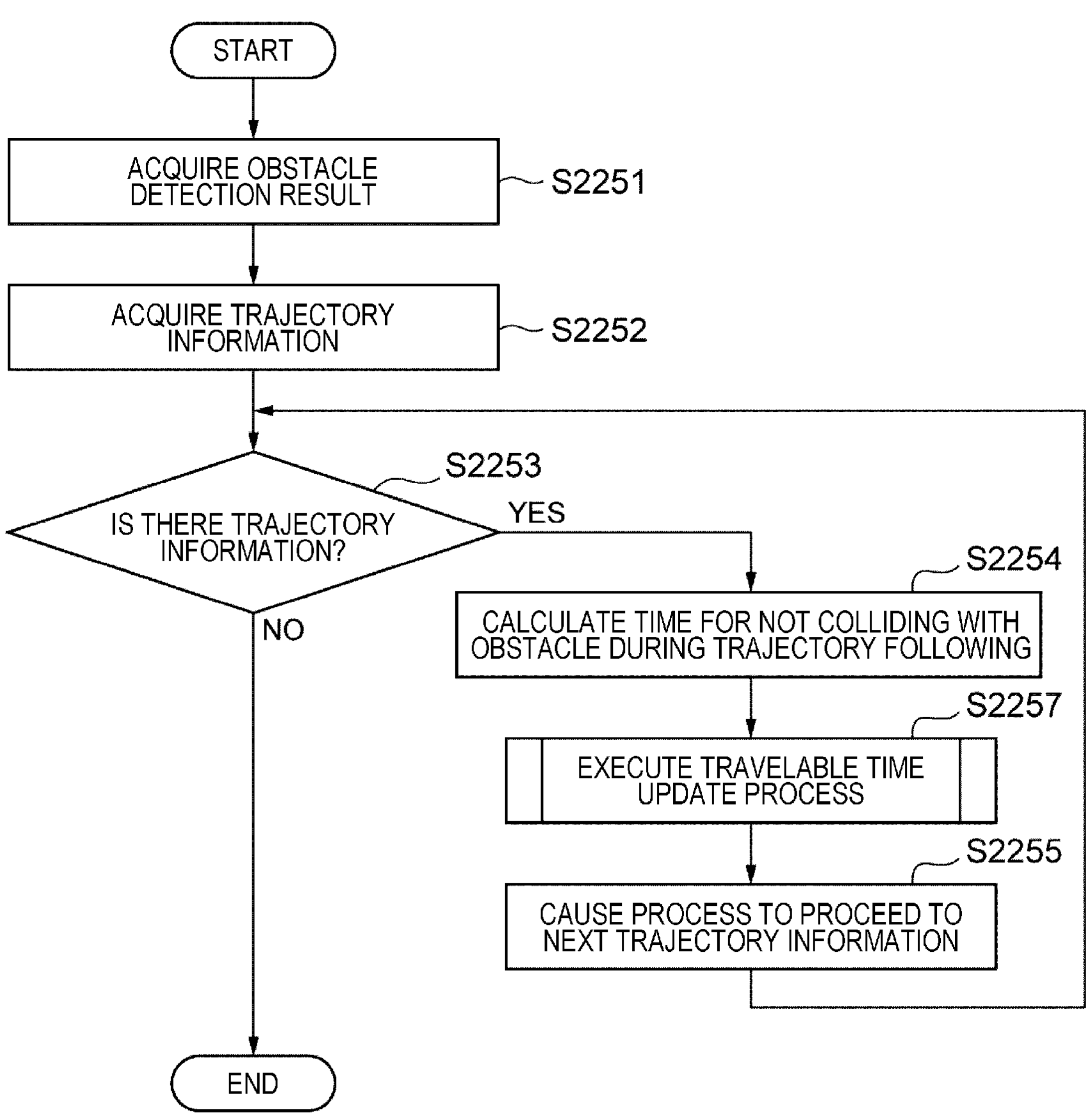
FIG. 19 is a diagram illustrating an outline of a processing flow in a travelable-time-added trajectory calculation unit 22 in Example 4.

FIG. 19 is a diagram illustrating an outline of a processing flow in the travelable-time-added trajectory calculation unit 22 in Example 4. Steps S2251 to S2255 in FIG. 19 are the same as Steps S2251 to S2255 in FIG. 8 described in Example 1.

In Step S2251, an obstacle detection result 222 is acquired.

In Step S2252, trajectory information 224 is acquired.

In Step S2253, it is checked whether the acquired trajectory information 224 includes unprocessed trajectory information. When the unprocessed trajectory information is included, the process proceeds to Step S2254, and, when the unprocessed trajectory information is not included, the process is ended.

In Step S2254, a time condition for not colliding with an obstacle (for guaranteeing not to collide with an obstacle) during trajectory following is calculated.

In Step S2257, a travelable time update process is executed with reference to the travelable-time-added trajectory calculation result storing unit 26. Details of the travelable time update process will be described later.

In Step S2255, one piece of unprocessed trajectory information is selected from the trajectory information included in the acquired trajectory information 224, and the process proceeds to Step S2253.

According to the above flow, the travelable-time-added trajectory calculation unit 22 refers to the trajectory information that is generated for (the in-vehicle device 1 of) another vehicle and is stored in the travelable-time-added trajectory calculation result storing unit 26 with respect to the trajectory information 224 acquired in Step S2252, and calculates the time in which the vehicle does not collide with an obstacle during trajectory following.

<Travelable Time Update Process>

Figure 20:
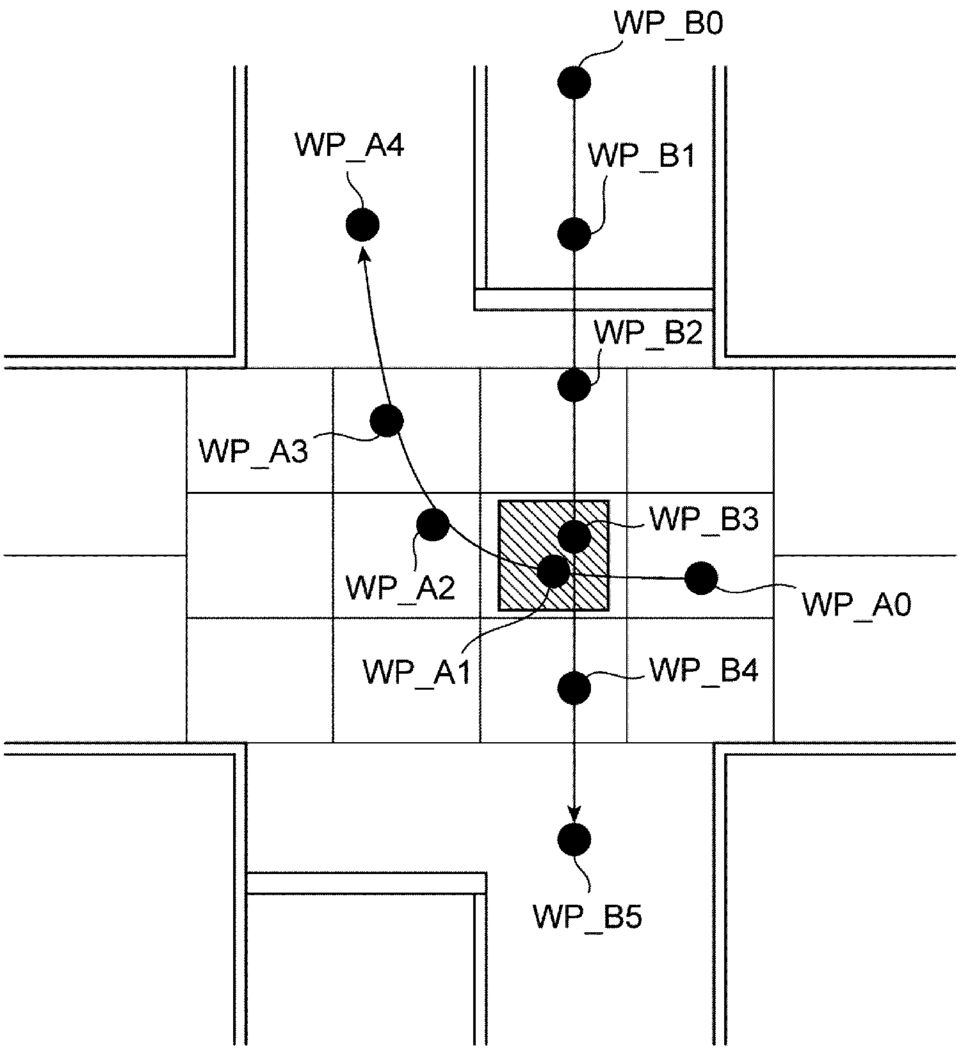
FIG. 20 is a diagram schematically illustrating an outline of a travelable time update process executed by the travelable-time-added trajectory calculation unit 22 in Example 4.

FIG. 20 is a diagram schematically illustrating an outline of (Step S2257 in FIG. 19) the travelable time update process executed by the travelable-time-added trajectory calculation unit 22 in Example 4. In the control system 0 in Example 4, the number of vehicles equipped with the in-vehicle device 1 is two, but the present example is not limited thereto.

WP_A indicates a travel trajectory calculated for a vehicle A, WP_B represents a travel trajectory calculated for a vehicle B, and the travelable time (ST and FT) of WP_A is calculated before the travelable time (ST and FT) of WP_B.

In the calculation of the travelable time (ST and FT) for WP_B, first, it is checked whether or not each Way Point included in WP_A is close to each Way Point included in WP_B. In the case of FIG. 20, since the distance between WP_B3 of WP_B and WP_A1 of WP_A is 70 cm, WP_B3 of WP_B is determined to be close to WP_A1 of WP_A. In the proximity determination, when the distance between WPs is shorter than a threshold value based on the threshold value separately provided, the proximity is determined, and the threshold value is, for example, 1 m.

Then, the travelable-time-added trajectory calculation unit 22 refers to the travelable-time-added trajectory information 23 regarding WP_A. Since FT of WP_A1 is T3, it is understood that the vehicle A has completed traveling near WP_A1, that is, WP_B3 by T3, or has not started traveling near WP_A1, that is, WP_B3. Thus, the travelable-time-added trajectory calculation unit 22 sets ST of WP_B3 close to WP_A1 as a value after T3. Note that, even when there is another vehicle equipped with the in-vehicle device 1, it is possible to update the travelable time with reference to the travelable-time-added trajectory information of the other vehicle in the similar manner.

<Operational Effects>

As described above, in the control system 0 in Example 4, the coordination device 2 includes a travelable-time calculation result storing unit (the travelable-time-added trajectory calculation result storing unit 26) that stores the travelable time calculated for a plurality of the in-vehicle devices 1 in association with the travel trajectory.

According to Example 4, since the travelable-time-added trajectory information 23 is generated in consideration of the travel trajectory and the traveling time point of another vehicle, there is an effect that it is possible to reliably avoid an occurrence of a situation in which a plurality of vehicles exists at the same point at the same time point (in other words, secure exclusive controllability).

<Summary of Operational Effects of Examples>

According to the control system and the method in Example 1, there are effects that the safety of the vehicle control is guaranteed by performing the vehicle control in consideration of the delay actually occurring in the communication between the in-vehicle device 1 and the coordination device 2, and the number of times of decelerating and stopping the vehicle equipped with the in-vehicle device 1 is suppressed by lengthening the allowable communication delay time when there is no obstacle or the like on the travel trajectory and when there is no approaching obstacle or the like.

According to the control system and the method in Example 2, if there is no request from the in-vehicle device 1 side, the coordination device 2 does not need to calculate the travelable-time-added trajectory information 23, so that it is possible to reduce the processing load of the coordination device 2. In addition, since the communication between the in-vehicle device 1 and the coordination device 2 is limited to when there is the request from the in-vehicle device 1, it is possible to reduce the number and frequency of communications between the in-vehicle device 1 and the coordination device 2 and to continue control (trajectory following) while reducing the influence on vehicle control due to the communication load and the communication delay.

According to According to the control system and the method in Example 3, when the vehicle equipped with the in-vehicle device 1 stops and stands by until an obstacle or the like retreats after the occurrence of the emergency stop, and thus the travelable start time point ST and the travelable end time point FT of the travelable time are not satisfied, the vehicle travels on the travel trajectory by slowly traveling (deceleration or low-speed traveling) while eliminating the need for re-communication with the coordination device 2 and re-calculation by the coordination device 2, so that it is possible to continue vehicle control while securing the safety and to avoid an occurrence of a delay due to re-communication and re-calculation.

According to the control system and the method in Example 4, since the travelable-time-added trajectory information 23 is generated in consideration of the travel trajectory and the traveling time point of another vehicle, there is an effect that it is possible to reliably avoid an occurrence of a situation in which a plurality of vehicles exists at the same point at the same time point (in other words, secure exclusive controllability).

The present invention is not limited to the above examples, and various modification examples may be provided. For example, the above examples are described in detail in order to explain the present invention in an easy-to-understand manner, and the above examples are not necessarily limited to a case including all the described configurations. Further, some components in one example can be replaced with the components in another example, and the configuration of another example can be added to the configuration of one example. Regarding some components in the examples, other components can be added, deleted, and replaced.

Some or all of the configurations, functions, processing units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a storage device such as a hard disk and a solid state drive (SSD), or a recording medium such as an IC card, an SD card, and a DVD.

Control lines and information lines considered necessary for the descriptions are illustrated, and not all the control lines and the information lines in the product are necessarily shown. In practice, it may be considered that almost all components are connected to each other.

REFERENCE SIGNS LIST

0 control system
1 in-vehicle device
2 coordination device
3 infrastructure sensor
11 time-point synchronization unit
110 GNSS information acquisition unit
111 absolute time-point calculation unit
112 correction information transmission and reception unit
113 time-point correction unit
12 travelable-time-added trajectory information reception unit
13 travelability determination unit
14 trajectory following unit
15 independent traveling propriety determination unit
16 request transmission unit
17 emergency stop unit
18 speed limiting unit
19 control information
21 sensing data reception unit
22 travelable-time-added trajectory calculation unit
221 obstacle detection unit
222 obstacle detection result
223 trajectory calculation unit 2
231 road information
2232 vehicle route information
224 trajectory information
225 travelable time calculation unit
23 travelable-time-added trajectory information
24 travelable-time-added trajectory information transmission unit
25 request reception unit
26 travelable-time-added trajectory calculation result storing unit (travelable-time calculation result storing unit)
31 sensing unit
32 sensing data
33 sensing data transmission unit

The invention claimed is:

1. A control system including an in-vehicle device and a coordination device that are synchronized in time point, the control system comprising:
- a travelable time calculation circuit that calculates a travelable time for guaranteeing that a vehicle does not collide with an obstacle on a travel trajectory in a target region through which a vehicle equipped with the in-vehicle device passes;
- a travelability determination circuit that determines validity of the travelable time;
- a trajectory following circuit that controls the in-vehicle device to follow the travel trajectory when it is determined that the travelable time is valid;
- an independent traveling propriety determination circuit that determines, from the travel trajectory, whether or not there is an action that cannot be safely performed by the vehicle equipped with the in-vehicle device alone;
- a request transmission circuit that sends a request to the travelable time calculation circuit to recalculate the travelable time including a travelable start time point and a travelable end time point on the travel trajectory to the coordination device when it is determined that the action that cannot be safely performed is present; and
- a processor, a memory, and a storage in communication with each of the travelable time calculation circuit, the travelability determination circuit, the trajectory following circuit, the independent traveling propriety determination circuit, and the request transmission circuit,
- wherein the travelability determination circuit determines whether or not the vehicle equipped with the in-vehicle device is able to travel by satisfying the travelable start time point and the travelable end time point that are set at the respective points on the travel trajectory, and
- wherein the in-vehicle device performs automatic driving of the vehicle equipped with the in-vehicle device based on the travel trajectory.

2. The control system according to claim 1, wherein, when the travelable time of a current travel trajectory cannot be maintained due to an emergency stop of the vehicle equipped with the in-vehicle device while following the travel trajectory, after a condition of the emergency stop is released, the trajectory following circuit causes the vehicle equipped with the in-vehicle device to pass through the travel trajectory while decelerating, regardless of the travelable time.

3. The control system according to claim 1, wherein the coordination device includes a travelable-time calculation result storing circuit that stores the travelable time calculated for a plurality of in-vehicle devices, including the in-vehicle device, in association with the travel trajectory.

4. An in-vehicle device that is synchronized in time point with a coordination device installed outside a vehicle, the in-vehicle device comprising:
- a reception circuit that receives, from the coordination device, a travelable time for guaranteeing that a vehicle equipped with the in-vehicle device does not collide with an obstacle on a travel trajectory in a target region through which the vehicle equipped with the in-vehicle device passes;
- a travelability determination circuit that determines validity of the travelable time;
- a trajectory following circuit that controls the in-vehicle device to follow the travel trajectory when it is determined that the travelable time is valid;
- an independent traveling propriety determination circuit that determines, from the travel trajectory, whether or not there is an action that cannot be safely performed by the vehicle equipped with the in-vehicle device alone;
- a request transmission circuit that sends a request to the coordination device to recalculate the travelable time including a travelable start time point and a travelable end time point on the travel trajectory when it is determined that the action that cannot be safely performed is present; and
- a processor, a memory, and a storage in communication with each of the reception circuit, the travelability determination circuit, the trajectory following circuit, the independent traveling propriety determination circuit, and the request transmission circuit, wherein the travelability determination circuit determines whether or not the vehicle equipped with the in-vehicle device is able to travel by satisfying the travelable start time point and the travelable end time point that form the travelable time and are set at the respective points on the travel trajectory, and wherein the in-vehicle device performs automatic driving of the vehicle equipped with the in-vehicle device based on the travel trajectory.

5. A coordination device that is synchronized in time point with a vehicle equipped with an in-vehicle device, for reducing a processing load of the coordination device and reducing a number and a frequency of communications with the in-vehicle device, the coordination device comprising:

a travelable time calculation circuit that calculates a travelable time for guaranteeing that the vehicle equipped with the in-vehicle device does not collide with an obstacle on a travel trajectory in a target region through which the vehicle equipped with the in-vehicle device passes;

a transmission circuit that transmits the travelable time to the in-vehicle device in order to determine validity of the travelable time;

a travelability determination circuit that determines validity of the travelable time;

a request reception circuit that receives information from the in-vehicle device; and a processor, a memory, and a storage in communication with each of the travelable time calculation circuit, the transmission circuit, the travelability determination circuit, and the request reception circuit, wherein the request reception circuit receives, from the in-vehicle device, a request to assist in controlling the vehicle, the travelability determination circuit, based on the request, determines whether or not the vehicle equipped with the in-vehicle device is able to travel by satisfying a travelable start time point and a travelable end time point that form the travelable time and are set at the respective points on the travel trajectory, the transmission circuit transmits, to the in-vehicle device, the travelable time including a travelable start time point and a travelable end time point on the travel trajectory when it is determined that there is an action that cannot be safely performed by the vehicle equipped with the in-vehicle device alone and there is a request from the in-vehicle device, and causes the in-vehicle device to perform automatic driving of the vehicle equipped with the in-vehicle device based on the travel trajectory.

* * * * *